(12) United States Patent
Takagishi et al.

(10) Patent No.: US 11,062,728 B2
(45) Date of Patent: Jul. 13, 2021

(54) MAGNETIC HEAD HAVING SPECIFIC DISTANCE BETWEEN MAGNETIC POLE, STACKED BODY, AND FIRST SHIELD, AND MAGNETIC RECORDING DEVICE INCLUDING SAME

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Masayuki Takagishi, Tokyo (JP); Naoyuki Narita, Funabashi Chiba (JP); Tomoyuki Maeda, Kawasaki Kanagawa (JP); Hirofumi Suto, Ota Tokyo (JP); Tazumi Nagasawa, Yokohama Kanagawa (JP); Katsuya Sugawara, Kawasaki Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

(*) Notice: Subject to any disclaimer, the term of this patent is extended or adjusted under 35 U.S.C. 154(b) by 0 days.

(21) Appl. No.: 16/817,762

(22) Filed: Mar. 13, 2020

(65) Prior Publication Data
US 2021/0074319 A1 Mar. 11, 2021

(30) Foreign Application Priority Data
Sep. 6, 2019 (JP) .............................. JP2019-163029

(51) Int. Cl.
*G11B 5/31* (2006.01)
*G11B 5/127* (2006.01)
(Continued)

(52) U.S. Cl.
CPC .............. *G11B 5/1278* (2013.01); *G11B 5/02* (2013.01); *G11B 5/315* (2013.01); *G11B 5/3133* (2013.01);
(Continued)

(58) Field of Classification Search
None
See application file for complete search history.

(56) References Cited

U.S. PATENT DOCUMENTS 8,300,356 B2 * 10/2012 Zhang ................. H01F 10/3295
360/119.03
8,879,205 B2 * 11/2014 Shiimoto ............... G11B 21/02
360/125.3
(Continued)

FOREIGN PATENT DOCUMENTS

JP 2010-40060 A 2/2010

*Primary Examiner* — Jefferson A Evans
(74) *Attorney, Agent, or Firm* — Finnegan, Henderson, Farabow, Garrett & Dunner, L.L.P.

(57) ABSTRACT

According to one embodiment, a magnetic head includes a magnetic pole, a first shield, a first magnetic layer provided between the magnetic pole and the first shield, a second magnetic layer provided between the first magnetic layer and the first shield, and an intermediate layer provided between the first magnetic layer and the second magnetic layer. The intermediate layer is nonmagnetic. A first distance between the magnetic pole and the first magnetic layer along a first direction is not less than 1% and not more than 10% of a second distance between the magnetic pole and the first shield along the first direction. The first direction is from the first magnetic layer toward the second magnetic layer.

18 Claims, 16 Drawing Sheets

(51) Int. Cl.
  *G11B 5/65* (2006.01)
  *G11B 5/66* (2006.01)
  *G11B 5/02* (2006.01)
(52) U.S. Cl.
  CPC ............ *G11B 5/3146* (2013.01); *G11B 5/656* (2013.01); *G11B 5/66* (2013.01)

(56) References Cited

U.S. PATENT DOCUMENTS

| | | | | |
|---|---|---|---|---|
| 8,953,283 | B2* | 2/2015 | Shimizu | G11B 5/35 360/125.3 |
| 9,007,723 | B1* | 4/2015 | Igarashi | G11B 5/314 360/125.3 |
| 9,030,777 | B2* | 5/2015 | Sato | G11B 5/3146 360/125.3 |
| 10,388,305 | B1* | 8/2019 | De Albuquerque | G11B 5/314 |
| 10,643,643 | B1* | 5/2020 | Gao | G11B 5/235 |
| 2009/0207531 | A1* | 8/2009 | Shiimoto | G11B 5/3912 360/316 |
| 2010/0027158 | A1 | 2/2010 | Takagishi et al. | |
| 2014/0177100 | A1* | 6/2014 | Sugiyama | G11B 5/1278 360/125.03 |
| 2015/0131184 | A1* | 5/2015 | Nunokawa | G11B 5/332 360/236.8 |
| 2015/0243308 | A1* | 8/2015 | Takagishi | G11B 5/11 360/244 |
| 2015/0348574 | A1* | 12/2015 | Igarashi | G11B 5/00 360/99.08 |
| 2020/0176022 | A1* | 6/2020 | Li | G11B 5/21 |

* cited by examiner

MAGNETIC HEAD HAVING SPECIFIC DISTANCE BETWEEN MAGNETIC POLE, STACKED BODY, AND FIRST SHIELD, AND MAGNETIC RECORDING DEVICE INCLUDING SAME

CROSS-REFERENCE TO RELATED APPLICATIONS

This application is based upon and claims the benefit of priority from Japanese Patent Application No. 2019-163029, filed on Sep. 6, 2019; the entire contents of which are incorporated herein by reference.

FIELD

Embodiments described herein relate generally to a magnetic head and a magnetic recording device.

BACKGROUND

Information is recorded in a magnetic storage medium such as a HDD (Hard Disk Drive) or the like by using a magnetic head. It is desirable to increase the recording density of the magnetic head and the magnetic recording device.

DETAILED DESCRIPTION

Figure 1:
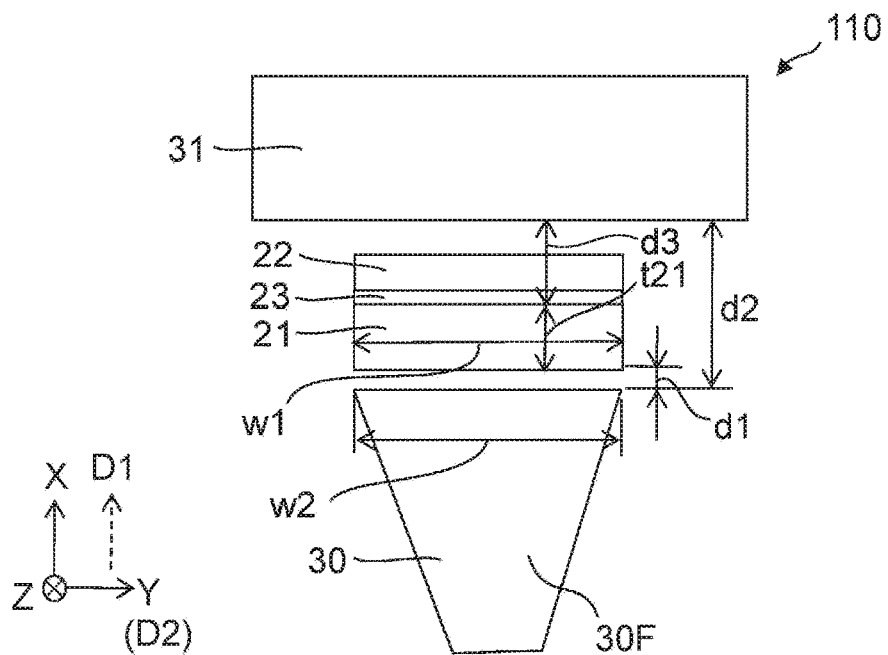
FIG. 1 is a schematic plan view illustrating a magnetic head according to a first embodiment.

According to one embodiment, a magnetic head includes a magnetic pole, a first shield, a first magnetic layer provided between the magnetic pole and the first shield, a second magnetic layer provided between the first magnetic layer and the first shield, and an intermediate layer provided between the first magnetic layer and the second magnetic layer. The intermediate layer is nonmagnetic. A first distance between the magnetic pole and the first magnetic layer along a first direction is not less than 1% and not more than 10% of a second distance between the magnetic pole and the first shield along the first direction. The first direction is from the first magnetic layer toward the second magnetic layer.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

Figure 2:
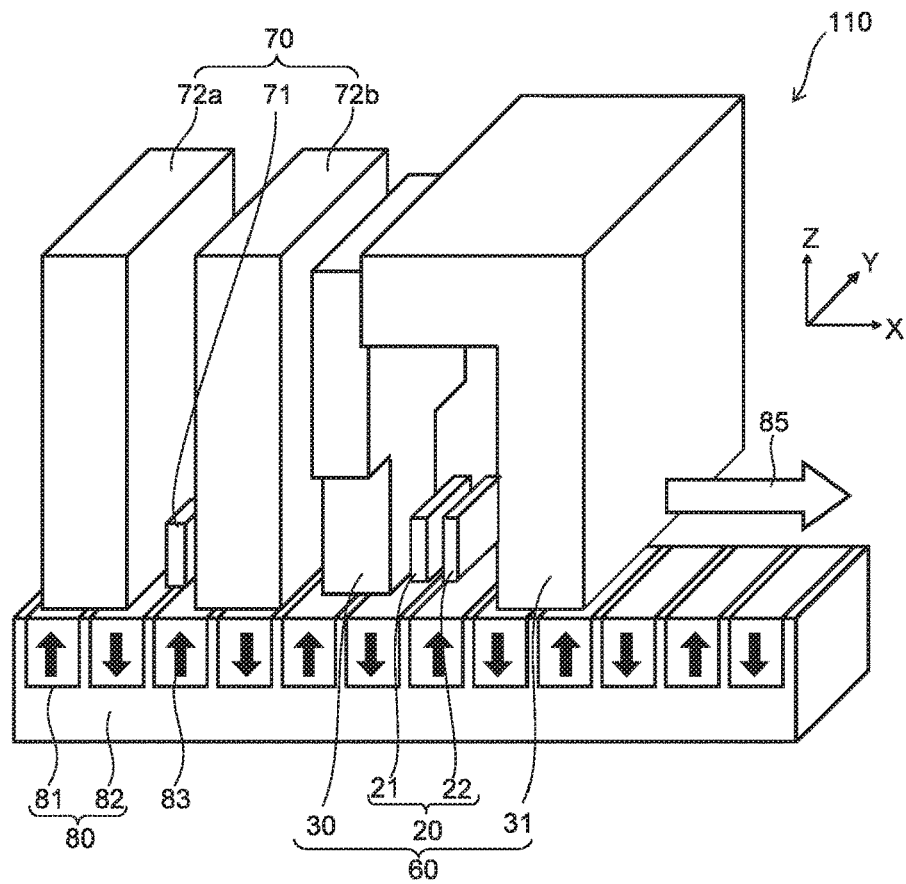
FIG. 2 is a schematic perspective view illustrating a magnetic recording device according to the first embodiment.
Figure 3:
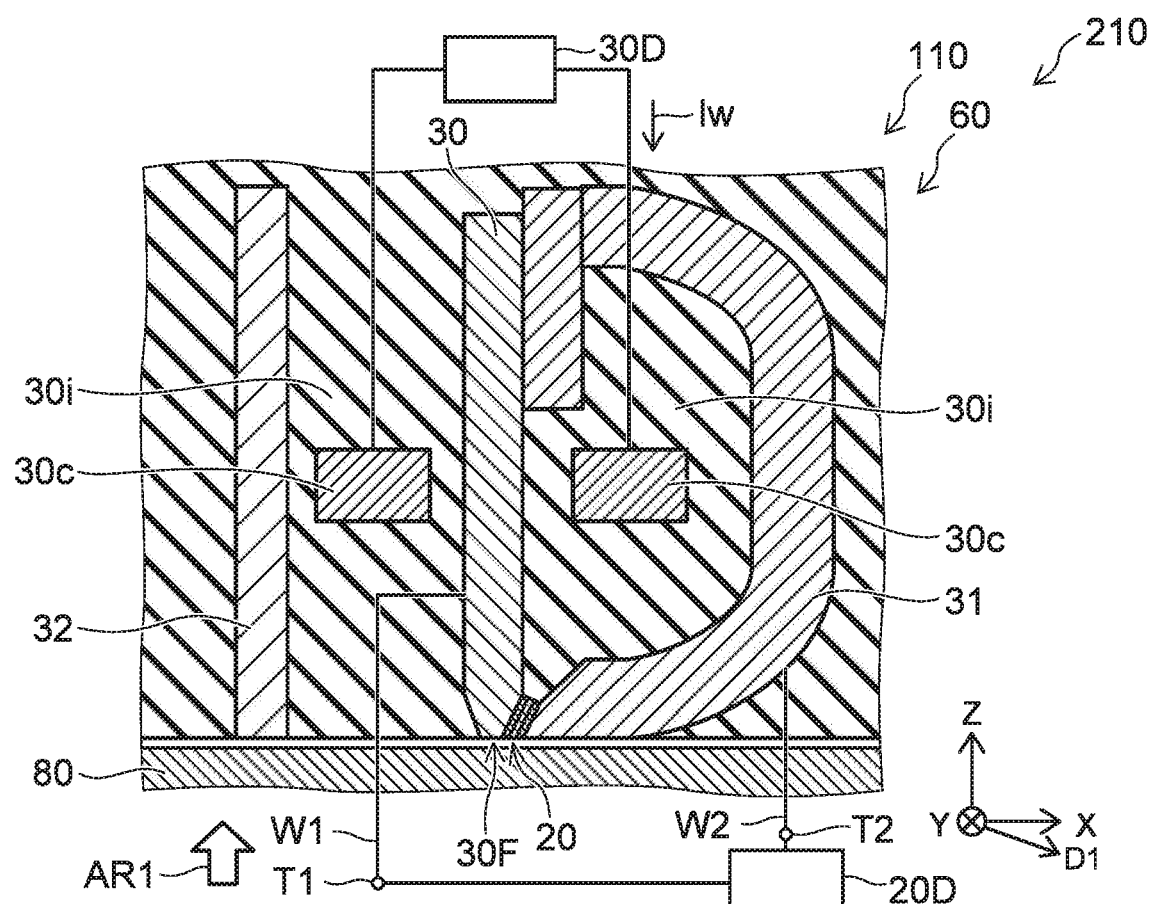
FIG. 3 is a schematic cross-sectional view illustrating the magnetic head according to the first embodiment.
Figure 4:
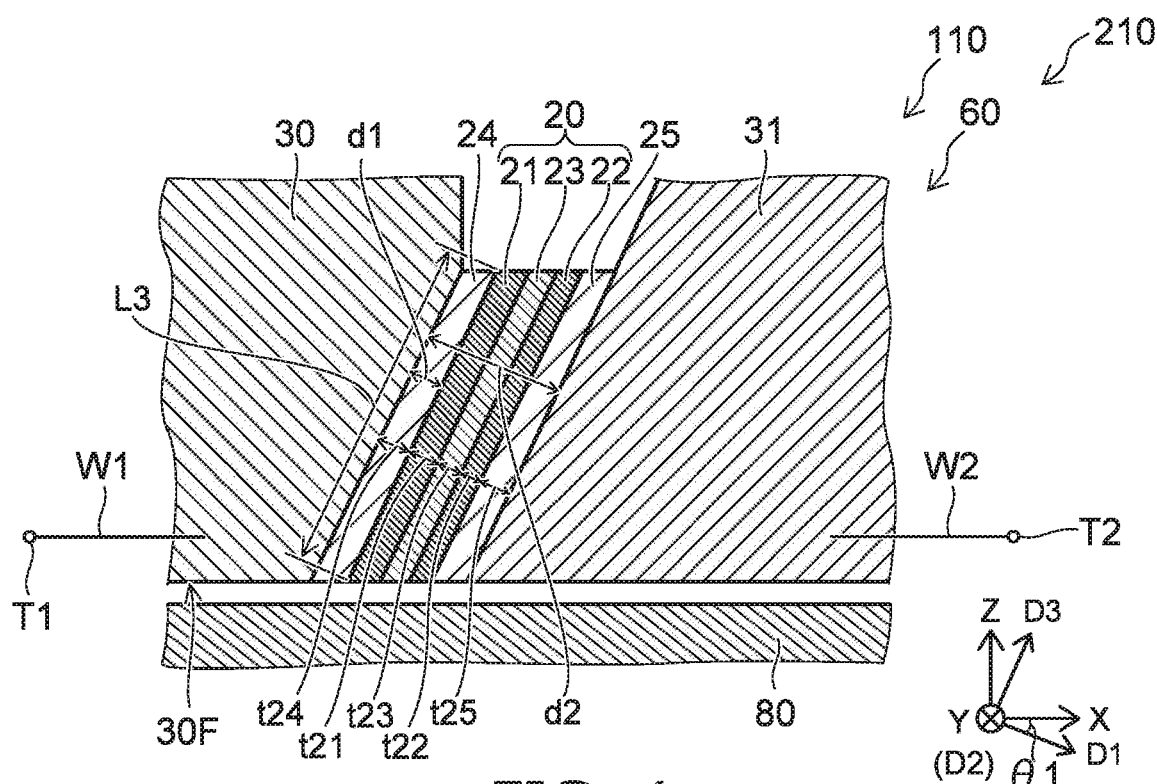
FIG. 4 is a schematic cross-sectional view illustrating the magnetic head according to the first embodiment.

FIG. 1 is a schematic plan view illustrating a magnetic head according to a first embodiment.
FIG. 2 is a schematic perspective view illustrating a magnetic recording device according to the first embodiment.
FIG. 3 and FIG. 4 are schematic cross-sectional views illustrating the magnetic head according to the first embodiment.

As shown in FIG. 2, the magnetic head 110 according to the embodiment is used with a magnetic recording medium 80. The magnetic recording device 210 according to the embodiment includes the magnetic head 110 and the magnetic recording medium 80. In the example, the magnetic head 110 includes a recording portion 60 and a reproducing portion 70. Information is recorded in the magnetic recording medium 80 by the recording portion 60 of the magnetic head 110. The information that is recorded in the magnetic recording medium 80 is reproduced by the reproducing portion 70. The magnetic recording medium 80 includes, for example, a medium substrate 82, and a magnetic recording layer 81 provided on the medium substrate 82. A magnetization 83 of the magnetic recording layer 81 is controlled by the recording portion 60.

The reproducing portion 70 includes, for example, a first reproduction magnetic shield 72a, a second reproduction magnetic shield 72b, and a magnetic reproducing element 71. The magnetic reproducing element 71 is provided between the first reproduction magnetic shield 72a and the second reproduction magnetic shield 72b. The magnetic reproducing element 71 can output a signal corresponding to the magnetization 83 of the magnetic recording layer 81.

As shown in FIG. 2, the recording portion 60 of the magnetic head 110 includes a magnetic pole 30, a first shield 31, a first magnetic layer 21, and a second magnetic layer 22. The first magnetic layer 21 is provided between the magnetic pole 30 and the first shield 31. The second magnetic layer 22 is provided between the first magnetic layer 21 and the first shield 31. The first magnetic layer 21 and the second magnetic layer 22 are included in a stacked body 20.

As shown in FIG. 2, the magnetic recording medium 80 moves relative to the magnetic head 110 in the direction of a medium movement direction 85. Information that corresponds to the magnetization 83 of the magnetic recording layer 81 is controlled by the magnetic head 110 at any position. Information that corresponds to the magnetization 83 of the magnetic recording layer 81 is reproduced by the magnetic head 110 at any position. As shown in FIG. 3, a coil 30c is provided in the magnetic head 110. A recording current Iw is supplied from a recording circuit 30D to the coil 30c. A recording magnetic field that corresponds to the recording current Iw is applied to the magnetic recording medium 80 from the magnetic pole 30. The magnetic pole 30 is, for example, a major magnetic pole. The first side shield is, for example, an auxiliary magnetic pole. A magnetic circuit is formed of the magnetic pole 30 and the first side shield.

As shown in FIG. 3, the magnetic pole 30 has a medium-opposing surface 30F. The medium-opposing surface 30F is, for example, an ABS (Air Bearing Surface). For example, the medium-opposing surface 30F opposes the magnetic recording medium 80.

A direction perpendicular to the medium-opposing surface 30F is taken as a Z-axis direction. One direction perpendicular to the Z-axis direction is taken as an X-axis direction. A direction perpendicular to the Z-axis direction and the X-axis direction is taken as a Y-axis direction.

The Z-axis direction is, for example, the height direction. The X-axis direction is, for example, the down-track direction. The Y-axis direction is, for example, the cross-track direction.

As shown in FIG. 3, an electrical circuit 20D is electrically connected to the stacked body 20. In the example, the stacked body 20 is electrically connected to the magnetic pole 30 and the first shield 31. A first terminal T1 and a second terminal T2 are provided in the magnetic head 110. The first terminal T1 is electrically connected to the stacked body 20 via wiring W1 and the magnetic pole 30. The second terminal T2 is electrically connected to the stacked body 20 via wiring W2 and the first shield 31. For example, a current (which may be, for example, a direct current) is supplied from the electrical circuit 20D to the stacked body 20. An alternating-current magnetic field is generated from the stacked body 20 when the current flows in the stacked body 20. The alternating-current magnetic field is applied to a portion of the magnetic recording medium 80. For example, at the portion of the magnetic recording medium 80 where the alternating-current magnetic field is applied, magnetic resonance is generated; and the orientation of the magnetization 83 changes easily. For example, MAMR (Microwave Assisted Magnetic Recording) is performed in the magnetic head 110. The first magnetic layer 21 is, for example, an oscillation generation layer. The second magnetic layer 22 is, for example, a spin injection layer.

As shown in FIG. 3, a second shield 32 may be provided in the recording portion 60. The magnetic pole 30 is provided between the second shield 32 and the first shield 31. An insulating portion 30i is provided around the first shield 31, the second shield 32, and the magnetic pole 30.

As shown in FIG. 4, the recording portion 60 of the magnetic head 110 further includes an intermediate layer 23 in addition to the magnetic pole 30, the first shield 31, the first magnetic layer 21, and the second magnetic layer 22. The intermediate layer 23 is provided between the first magnetic layer 21 and the second magnetic layer 22. The intermediate layer 23 is nonmagnetic. The stacked body 20 includes the intermediate layer 23. The intermediate layer 23 is conductive. The intermediate layer 23 includes, for example, Cu, etc.

In the example as shown in FIG. 4, the magnetic head 110 (e.g., the recording portion 60) may further include a first nonmagnetic layer 24. The first nonmagnetic layer 24 is provided between the magnetic pole 30 and the first magnetic layer 21. In one example, the first nonmagnetic layer 24 includes at least one selected from the group consisting of Ru, Ta, Cr, and Ti.

In the example as shown in FIG. 4, the magnetic head 110 (e.g., the recording portion 60) further includes a second nonmagnetic layer 25. The second nonmagnetic layer 25 is provided between the second magnetic layer 22 and the first shield 31.

For example, the first nonmagnetic layer 24 and the second nonmagnetic layer 25 function as electrodes. The magnetic pole 30 and the first magnetic layer 21 are electrically connected by the first nonmagnetic layer 24. The second magnetic layer 22 and the first shield 31 are electrically connected by the second nonmagnetic layer 25.

As shown in FIG. 3 and FIG. 4, the surface of the magnetic pole 30 opposing the first shield 31 and the surface of the first shield 31 opposing the magnetic pole 30 may be oblique to the medium-opposing surface 30F. For example, the first magnetic layer 21 and the second magnetic layer 22 are along the surface of the magnetic pole 30 opposing the first shield 31 and the surface of the first shield 31 opposing the magnetic pole 30.

The direction from the first magnetic layer 21 toward the second magnetic layer 22 is taken as a first direction D1. The first direction D1 corresponds to the stacking direction of the stacked body 20. In the example, the first direction D1 is oblique to the Z-axis direction.

As shown in FIG. 4, the first magnetic layer 21 has a first thickness t21. The second magnetic layer 22 has a thickness t22. The intermediate layer 23 has a thickness t23. The first nonmagnetic layer 24 has a thickness t24. The second nonmagnetic layer 25 has a thickness t25. These thicknesses are lengths along the first direction D1.

The thickness t22 of the second magnetic layer 22 along the first direction D1 is thinner than the first thickness t21 of the first magnetic layer 21 along the first direction D1. By setting the second magnetic layer 22 (e.g., the spin injection layer) to be thinner than the first magnetic layer 21 (e.g., the oscillation generation layer), for example, the reversal of the magnetization of the second magnetic layer 22 is stable. Spin is injected stably into the first magnetic layer 21 by the reversal of the magnetization of the second magnetic layer 22.

As shown in FIG. 4, the distance along the first direction D1 between the magnetic pole 30 and the first magnetic layer 21 is taken as a first distance d1. The first distance d1 corresponds to the thickness t24 of the first nonmagnetic layer 24 when the first nonmagnetic layer 24 is provided between the magnetic pole 30 and the first magnetic layer 21, and the first nonmagnetic layer 24 contacts the magnetic pole 30 and the first magnetic layer 21. As shown in FIG. 4, the distance along the first direction D1 between the magnetic pole 30 and the first shield 31 is taken as a second distance d2. The second distance d2 corresponds to the magnetic gap.

In the embodiment, the first distance d1 between the magnetic pole 30 and the first magnetic layer 21 along the first direction D1 from the first magnetic layer 21 toward the second magnetic layer 22 is not less than 1% and not more than 10% of the second distance d2 between the magnetic pole 30 and the first shield 31 along the first direction D1.

Thus, in the embodiment, the distance (the first distance d1) between the magnetic pole 30 and the first magnetic layer 21 (the oscillation generation layer) is set to be extremely small compared to the magnetic gap (the second distance d2). It was found that stable oscillations are obtained thereby. For example, stable MAMR is obtained. According to the embodiment, a magnetic head and a magnetic recording device can be provided in which the recording density can be increased.

Examples of characteristics of the magnetic head 110 are described below.

As shown in FIG. 4, the length of the first magnetic layer 21 along a third direction D3 is taken as a third length L3. The third direction D3 crosses a plane including the first direction D1 and a second direction D2. For example, the third direction D3 is perpendicular to the first direction D1 and the second direction D2.

FIG. 1 is a plan view as viewed along arrow AR1 of FIG. 3. The first nonmagnetic layer 24, the second nonmagnetic layer 25, and the insulating portion 30i are not illustrated in FIG. 1. As described in reference to FIG. 4, the distance along the first direction D1 between the magnetic pole 30 and the first magnetic layer 21 is the first distance d1. The distance along the first direction D1 between the magnetic pole 30 and the first shield 31 is the second distance d2. In the example, these distances are oblique to the X-axis direction.

As shown in FIG. 1, the width of the first magnetic layer 21 along a second direction D2 is taken as a first width w1. The width of the magnetic pole 30 along the second direction D2 is taken as a second width w2. The second direction D2 crosses the first direction D1 and is along the medium-opposing surface 30F. For example, the second direction D2 is orthogonal to the first direction D1.

In FIG. 3 and FIG. 4, the stacking direction of the stacked body 20 (the first direction D1) is oblique to the medium-opposing surface 30F. The angle between the first direction D1 and the medium-opposing surface 30F is taken as an angle θ1. The angle θ1 is, for example, not less than 15 degrees and not more than 30 degrees. The angle θ1 may be 0 degrees.

In the embodiment, the first direction D1 may be parallel to the medium-opposing surface 30F. In such a case, the first direction D1 is aligned with the X-axis direction; the second direction D2 is aligned with the Y-axis direction; and the third direction D3 is aligned with the Z-axis direction. In such a case, the angle θ1 is 0 degrees.

Examples of characteristics of the magnetic head will now be described. Hereinbelow, the angle θ1 is taken to be 0 degrees. In the simulation of the characteristics of the magnetic head described below, the saturation magnetization of the magnetic pole 30 is 2.4 T; and the saturation magnetization of the first shield 31 is 2.4 T.

Figure 5:
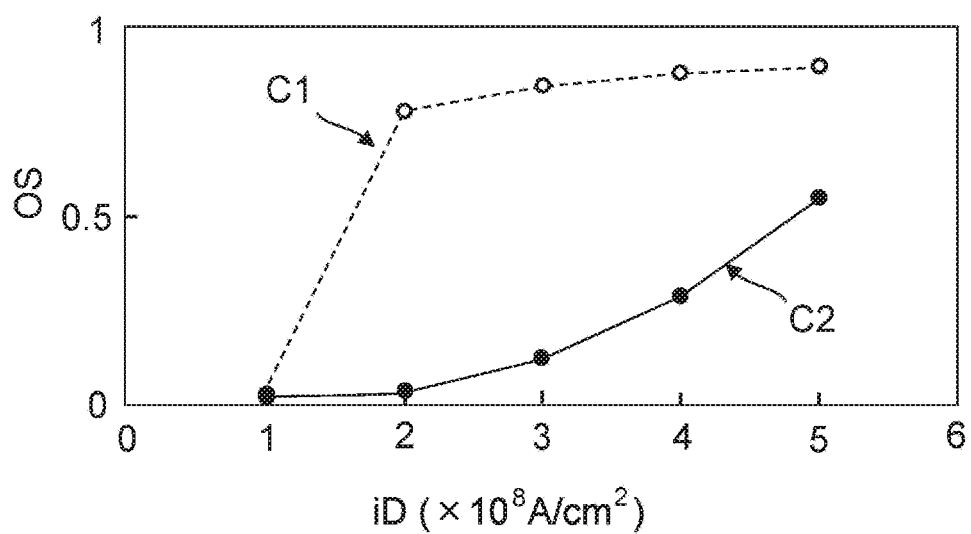
FIG. 5 is a graph illustrating characteristics of the magnetic head.

FIG. 5 is a graph illustrating characteristics of the magnetic head.

FIG. 5 illustrates simulation results of the oscillation characteristics of the stacked body 20 for a first condition C1 and a second condition C2. In the first condition C1, the stacked body 20 that includes the first magnetic layer 21, the intermediate layer 23, and the second magnetic layer 22 is not placed between the magnetic pole 30 and the first shield 31; and only the stacked body 20 is provided. In the second condition C2, the same stacked body 20 is placed between the magnetic pole 30 and the first shield 31. In the second condition C2, the distance (the first distance d1) between the magnetic pole 30 and the first magnetic layer 21 is 8 nm. The horizontal axis of FIG. 5 is a current density iD ($\times 10^8$ A/cm$^2$) flowing in the stacked body 20. The vertical axis of FIG. 5 is an oscillation intensity OS (a relative value).

As shown in FIG. 5, oscillation occurs as the current density iD increases for the first condition C1 and the second condition C2. It can be seen that the oscillation starts at a lower current density iD for the first condition C1 than for the second condition C2. It is more difficult to generate the oscillation for the second condition C2 than for the first condition C1.

It had been considered that it is difficult to generate the oscillation for the second condition C2 because the first magnetic layer 21 (the oscillation generation layer) is affected by the magnetic pole 30. Therefore, to easily obtain a stable oscillation in the first magnetic layer 21, the general approach is to set the distance (the first distance d1) between the magnetic pole 30 and the first magnetic layer 21 to be long so that the first magnetic layer 21 is not affected easily by the magnetic pole 30. For example, generally, the first distance d1 is set to about 8 nm or more.

Figure 6A:
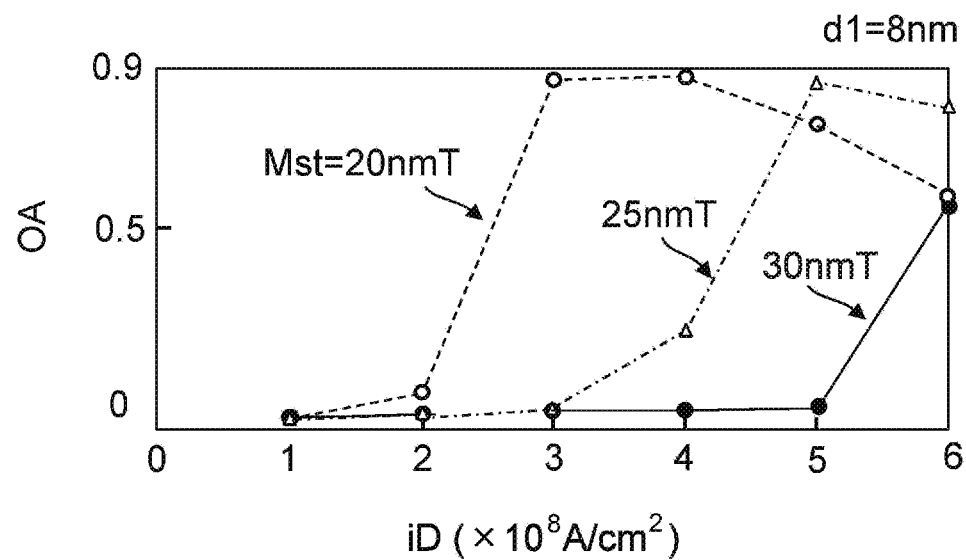
FIG. 6A and FIG. 6B are graphs illustrating characteristics of the magnetic head.
Figure 6B:
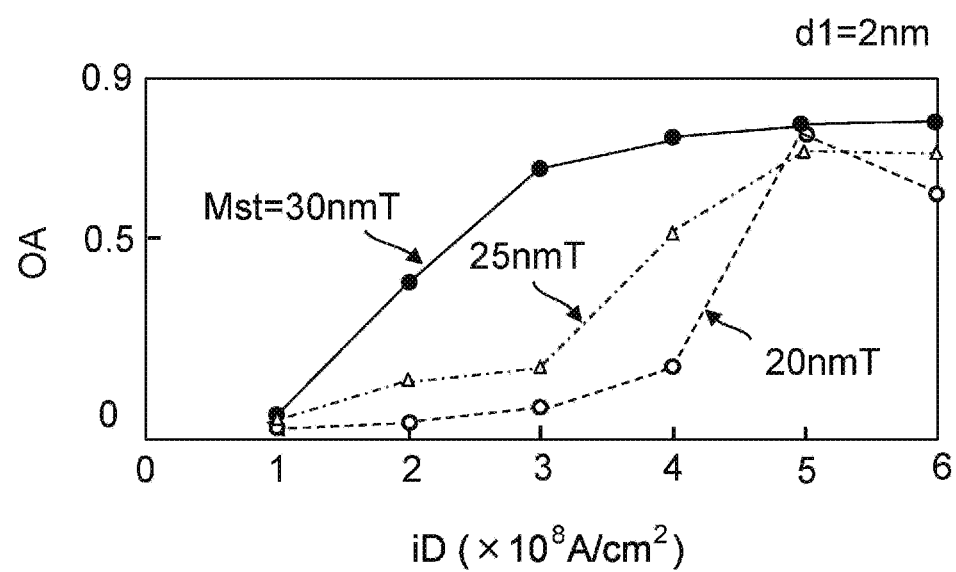

FIG. 6A and FIG. 6B are graphs illustrating characteristics of the magnetic head.

These figures illustrate simulation results of the oscillation characteristics of the stacked body 20 for the second condition C2. FIG. 6A corresponds to when the first distance d1 is 8 nm. FIG. 6B corresponds to when the first distance d1 is 2 nm. In these figures, the horizontal axis is the current density iD ($\times 10^8$ A/cm$^2$). In these figures, the vertical axis is an oscillation amplitude OA (arbitrary units). In these figures, the characteristics when a magnetic thickness Mst of the first magnetic layer 21 is 20 nmT, 25 nmT, and 30 nmT are shown. The magnetic thickness Mst is the product of a saturation magnetization Ms of the first magnetic layer 21 and the thickness (the first thickness t21) of the first magnetic layer 21.

When the first distance d1 is 8 nm as shown in FIG. 6A, the current density iD at which the oscillation starts increases as the magnetic thickness Mst increases. This phenomenon is a phenomenon that generally can be predicted.

It was found that when the first distance d1 is 2 nm as shown in FIG. 6B, the current density iD at which the oscillation starts decreases as the magnetic thickness Mst increases.

Thus, it was found that the characteristics are different between when the first distance d1 is short such as 2 nm and when the first distance d1 is long such as 8 nm.

The oscillation characteristics when the first distance d1 is 8 nm and when the first distance d1 is 2 nm will now be described.

Figure 7A:
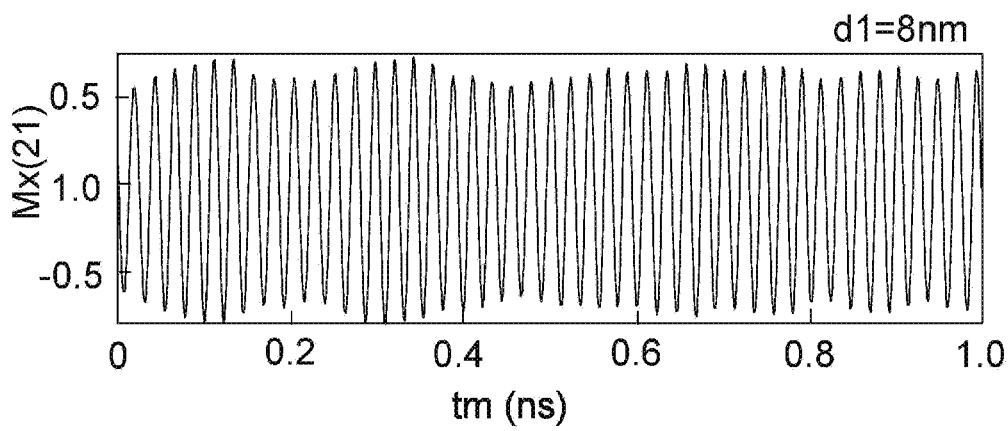
FIG. 7A to FIG. 7C are graphs illustrating characteristics of the magnetic head.
Figure 7B:
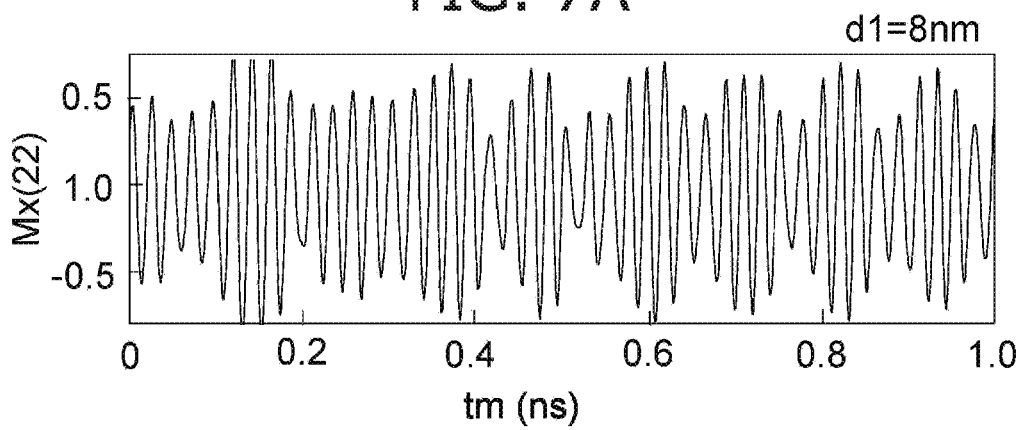
Figure 7C:
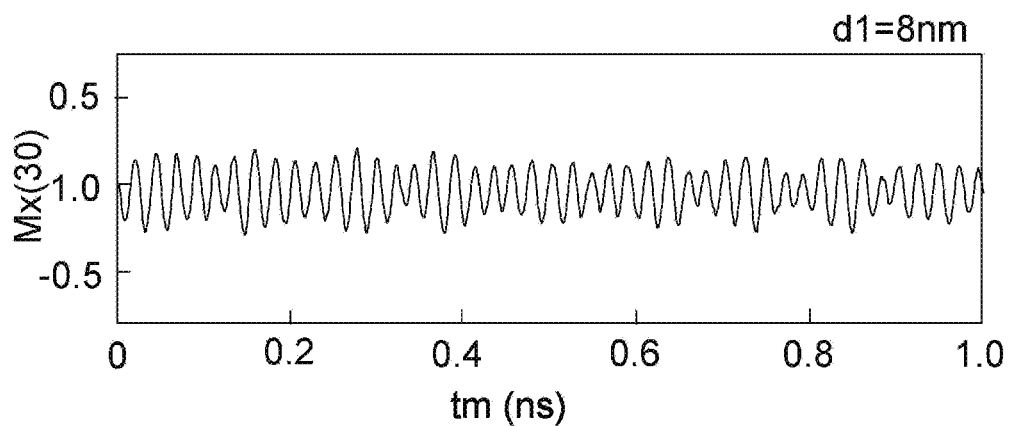

FIG. 7A to FIG. 7C are graphs illustrating characteristics of the magnetic head.

These figures correspond to when the first distance d1 is 8 nm, and the magnetic thickness Mst of the first magnetic layer 21 is 30 nmT. In FIG. 7A to FIG. 7C, the horizontal axis is a time tm (ns). The vertical axis corresponds to a magnetization Mx. FIG. 7A to FIG. 7C correspond respectively to the first magnetic layer 21, the second magnetic layer 22, and the magnetic pole 30.

As shown in FIG. 7A, the magnetization Mx(21) of the first magnetic layer 21 oscillates. As shown in FIG. 7B, the magnetization Mx(22) of the second magnetic layer 22 also oscillates. As shown in FIG. 7C, the magnetization Mx(30) of the magnetic pole 30 also oscillates. The oscillations of the magnetization Mx(22) of the second magnetic layer 22 and the magnetization Mx(30) of the magnetic pole 30 are unstable.

Figure 8A:
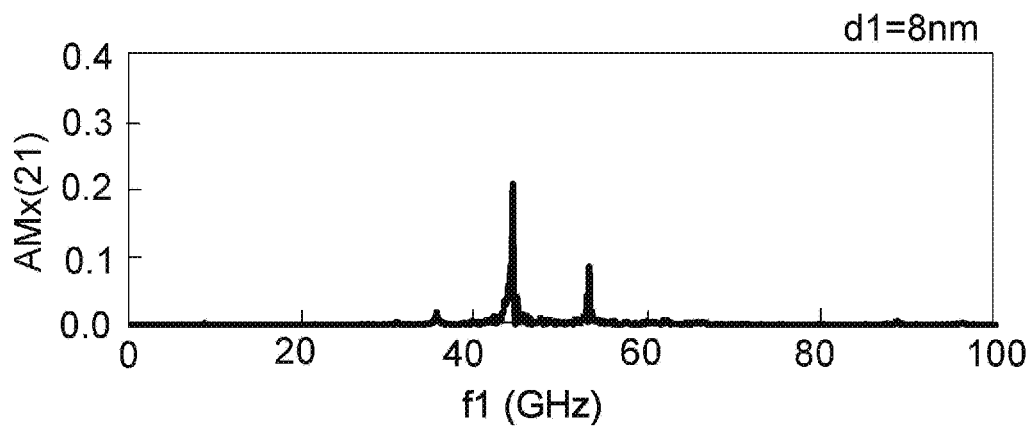
FIG. 8A to FIG. 8C are graphs illustrating characteristics of the magnetic head.
Figure 8B:
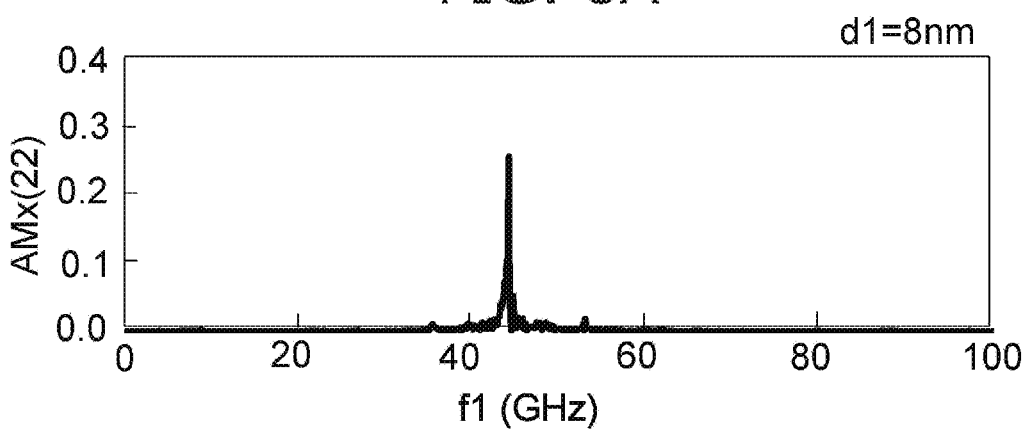
Figure 8C:
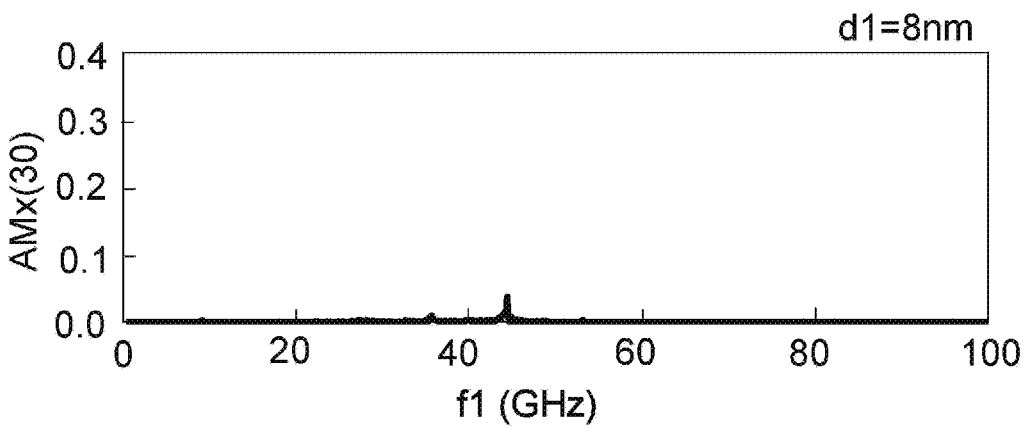

FIG. 8A to FIG. 8C are graphs illustrating characteristics of the magnetic head.

These figures illustrate the results of Fourier transforms of the oscillation characteristics of FIG. 7A to FIG. 7C. In FIG. 8A to FIG. 8C, the horizontal axis is a frequency f1 (GHz). The vertical axis is an absolute value AMx of the magnetization Mx. FIG. 8A to FIG. 8C correspond respectively to the first magnetic layer 21, the second magnetic layer 22, and the magnetic pole 30.

As shown in FIG. 8A, a peak of the absolute value AMx(21) of the magnetization Mx of the first magnetic layer 21 occurs when the frequency f1 is about 41 GHz. A small peak of the absolute value AMx(21) of the magnetization Mx also appears at other frequencies f1.

As shown in FIG. 8B and FIG. 8C, a peak of the absolute value AMx(22) of the magnetization Mx of the second magnetic layer 22 and a peak of the absolute value AMx(30) of the magnetization Mx of the magnetic pole 30 occur when the frequency f1 is about 41 GHz. A small peak of the absolute value AMx(22) of the magnetization Mx and a small peak of the absolute value AMx(30) of the magnetization Mx also appear at other frequencies f1.

Figure 9A:
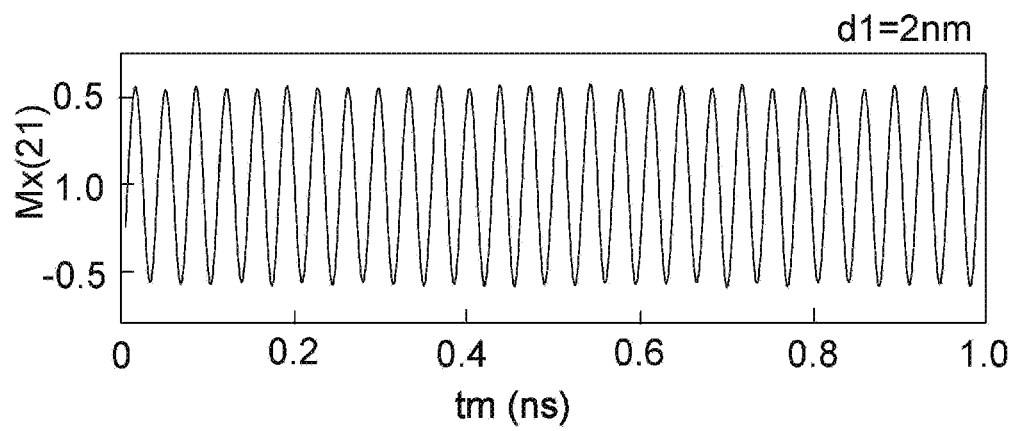
FIG. 9A to FIG. 9C are graphs illustrating characteristics of the magnetic head.
Figure 9B:
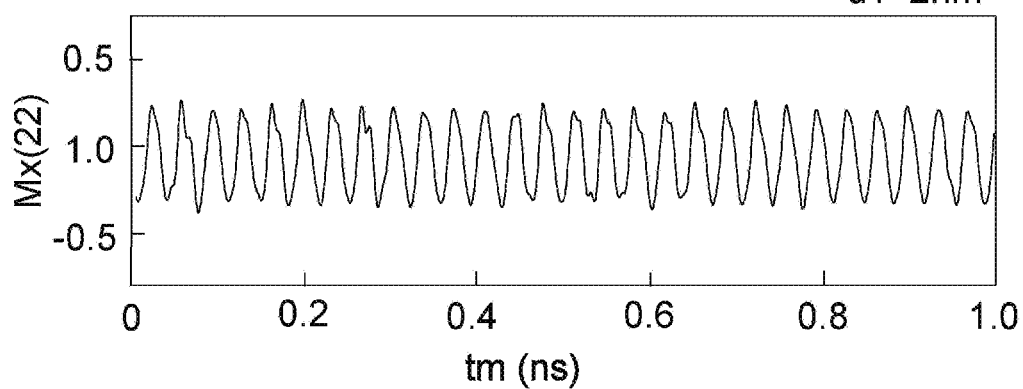
Figure 9C:
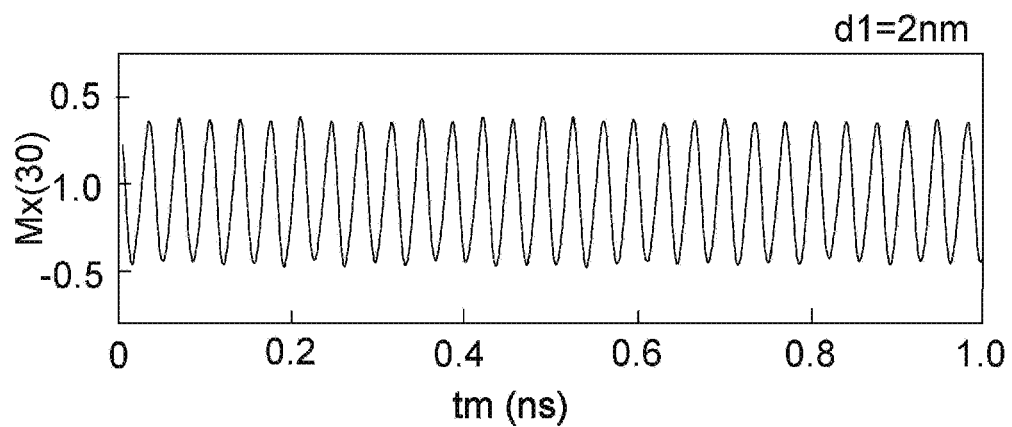

FIG. 9A to FIG. 9C are graphs illustrating characteristics of the magnetic head.

These figures correspond to when the first distance d1 is 2 nm, and the magnetic thickness Mst of the first magnetic layer 21 is 30 nmT. In FIG. 9A to FIG. 9C, the horizontal axis is the time tm (ns). The vertical axis corresponds to the magnetization Mx. FIG. 9A to FIG. 9C correspond respectively to the first magnetic layer 21, the second magnetic layer 22, and the magnetic pole 30.

As shown in FIG. 9A, the magnetization Mx(21) of the first magnetic layer 21 oscillates. As shown in FIG. 9B, the magnetization Mx(22) of the second magnetic layer 22 also oscillates. As shown in FIG. 9C, the magnetization Mx(30) of the magnetic pole 30 also oscillates. The oscillations of the magnetization Mx(22) of the second magnetic layer 22 and the magnetization Mx(30) of the magnetic pole 30 are extremely stable. It is considered that the magnetization Mx(21) is synchronous with the magnetization Mx(22) and the magnetization Mx(30).

Figure 10A:
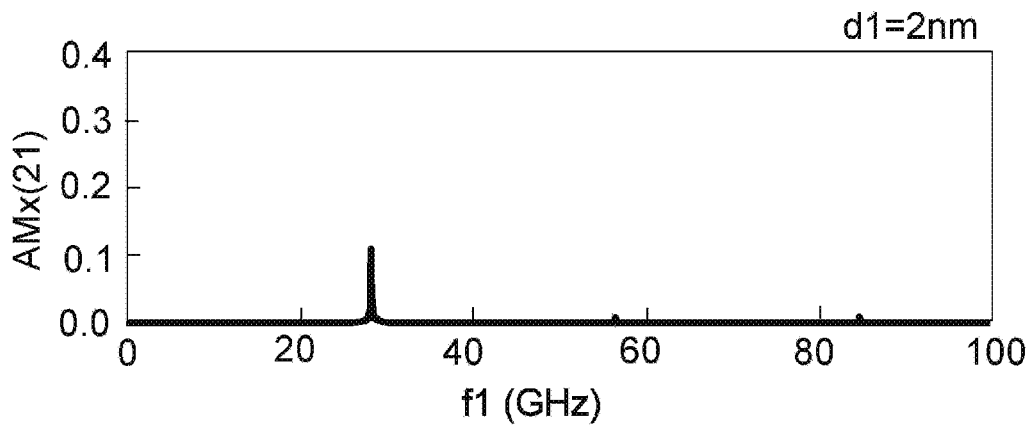
FIG. 10A to FIG. 10C are graphs illustrating characteristics of the magnetic head.
Figure 10B:
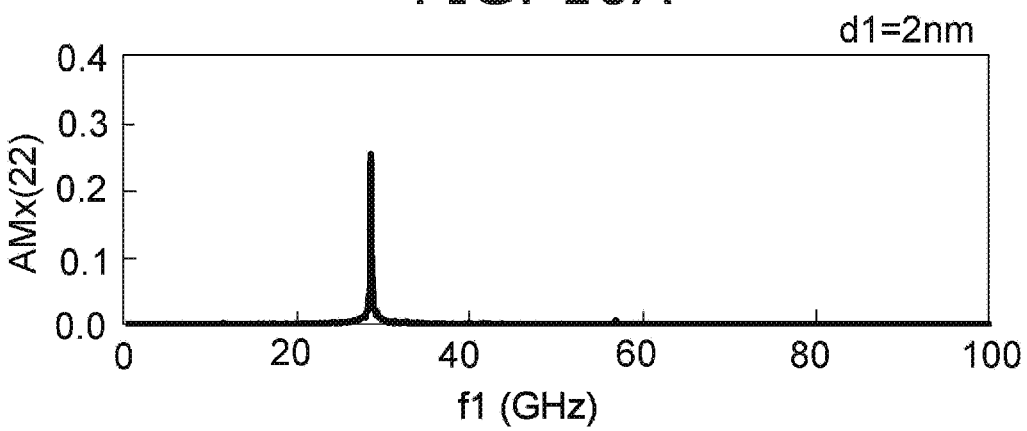
Figure 10C:
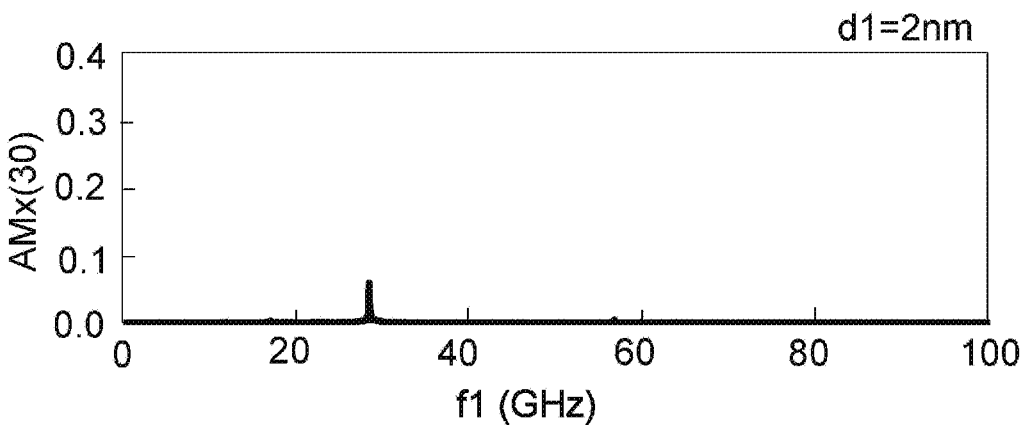

FIG. 10A to FIG. 10C are graphs illustrating characteristics of the magnetic head.

These figures illustrate the results of Fourier transforms of the oscillation characteristics of FIG. 9A to FIG. 9C. In FIG. 10A to FIG. 10C, the horizontal axis is the frequency f1 (GHz). The vertical axis is the absolute value AMx of the magnetization Mx. FIG. 10A to FIG. 10C correspond respectively to the first magnetic layer 21, the second magnetic layer 22, and the magnetic pole 30.

As shown in FIG. 10A to FIG. 10C, sharp peaks occur for the absolute value AMx(21) of the magnetization Mx of the first magnetic layer 21, the absolute value AMx(22) of the magnetization Mx of the second magnetic layer 22, and the absolute value AMx(30) of the magnetization Mx of the magnetic pole 30 when the frequency f1 is about 30 GHz. In the example, a peak is observed also when the frequency f1 is about 60 GHz (twice the peak frequency) for the absolute value AMx(30) of the magnetization Mx of the magnetic pole 30.

Thus, the first magnetic layer 21, the second magnetic layer 22, and the magnetic pole 30 oscillate at the same frequency f1 when the first distance d1 is 2 nm. It is considered that the first magnetic layer 21 and the magnetic pole 30 resonate with each other when the first distance d1 is 2 nm.

As recited above, the frequency f1 (about 30 GHz) of the peak when the first distance d1 is 2 nm is lower than the frequency f1 (about 41 GHz) of the peak when the first distance d1 is 8 nm. It is considered that this is caused by the first magnetic layer 21 resonating with the magnetic pole 30 and the oscillating volume being large when the first distance d1 is 2 nm.

Thus, it was found that the oscillation characteristics when the first distance d1 is 2 nm are completely different from those when the first distance d1 is 8 nm.

Generally, it has been considered that the magnetic pole 30 has unfavorable effects on the oscillation of the first magnetic layer 21. Generally, an approach has been employed in which the effects of the magnetic pole 30 on the first magnetic layer 21 are reduced by greatly separating the first magnetic layer 21 from the magnetic pole 30.

Conversely, in the embodiment, the effects of the magnetic pole 30 on the first magnetic layer 21 are increased by shortening the first distance d1 between the first magnetic layer 21 and the magnetic pole 30. Thereby, for example, the first magnetic layer 21 and the magnetic pole 30 resonate with each other; and stable oscillations are obtained. This approach is the reverse of the general approach.

In the embodiment, for example, the first distance d1 (the distance between the magnetic pole 30 and the first magnetic layer 21 along the first direction D1) is not less than 1% and not more than 10% of the second distance d2 (the distance between the magnetic pole 30 and the first shield 31 along the first direction D1). Stable oscillations are obtained thereby. For example, sharp peaks are obtained for the Fourier transforms of the oscillation characteristics.

In the embodiment, the first distance d1 is, for example, not less than 1 nm and not more than 4 nm.

Thus, when the first distance d1 is short, for example, the first magnetic layer 21 easily has magnetostatic field coupling with the magnetic pole 30. The first magnetic layer 21 resonates with the magnetic pole 30 easily. Stable oscillations are obtained.

As described above, the first nonmagnetic layer 24 may be provided between the magnetic pole 30 and the first magnetic layer 21. In one example, the first nonmagnetic layer 24 includes at least one selected from the group consisting of Ru, Ta, Cr, and Ti. In one example, the thickness t24 of the first nonmagnetic layer 24 along the first direction D1 is 3 nm or less. In one example, the thickness t24 of the first nonmagnetic layer 24 along the first direction D1 may be 1 nm or less. In such a case, the first magnetic layer 21 and the magnetic pole 30 have antiferromagnetic coupling with each other. The first magnetic layer 21 resonates with the magnetic pole 30 easily. More stable oscillations are obtained.

Figure 11:
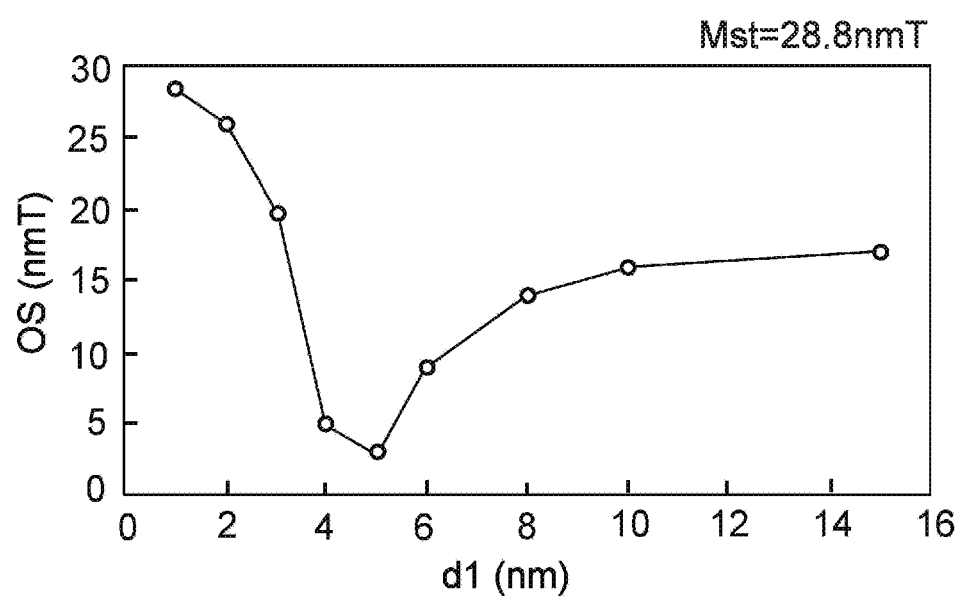
FIG. 11 is a graph illustrating a characteristic of the magnetic head.

FIG. 11 is a graph illustrating a characteristic of the magnetic head.

FIG. 11 illustrates simulation results of the oscillation characteristic when the first distance d1 is changed. In the model of the simulation, the magnetic thickness Mst of the first magnetic layer 21 is 28.8 nmT. The physical property values of $Fe_{60}Co_{40}$ are used as the physical property values of the first magnetic layer 21. The first distance d1 is the thickness t24 of the first nonmagnetic layer 24. The second distance d2 is 36 nm. The horizontal axis of FIG. 11 is the first distance d1 (nm). The vertical axis of FIG. 11 is the oscillation intensity OS (nmT).

As shown in FIG. 11, the oscillation intensity OS increases as the first distance d1 decreases in the region where the first distance d1 is 4 nm or less. Thus, intense oscillations are generated when the first distance d1 is 4 nm or less. In the embodiment, the first distance d1 may be 3.5 nm or less. In the embodiment, the first distance d1 may be 3 nm or less. More stable oscillations are obtained.

As shown in FIG. 11, a relatively high oscillation intensity OS is obtained when the first distance d1 is 8 nm or more. It is considered that this phenomenon is because the unfavorable effects of the magnetic pole 30 on the oscillation of the first magnetic layer 21 become small when the first distance d1 is 8 nm or more.

In the embodiment, it is favorable for the first thickness t21 of the first magnetic layer 21 (the thickness of the first magnetic layer 21 along the first direction D1) to be not less than 20% and not more than 40% of the second distance d2. More stable oscillations are obtained.

Figure 12A:
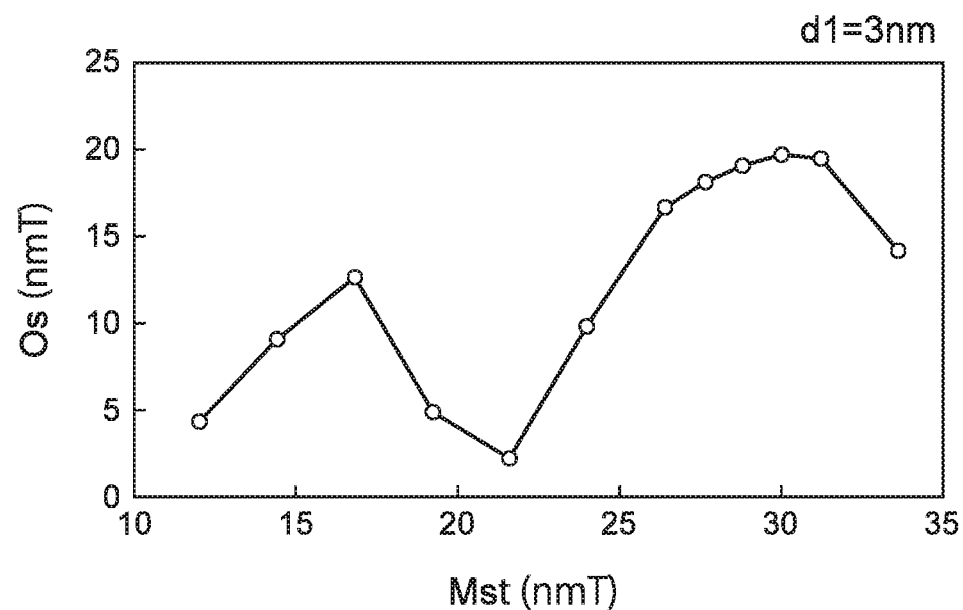
FIG. 12A and FIG. 12B are graphs illustrating characteristics of the magnetic head.
Figure 12B:
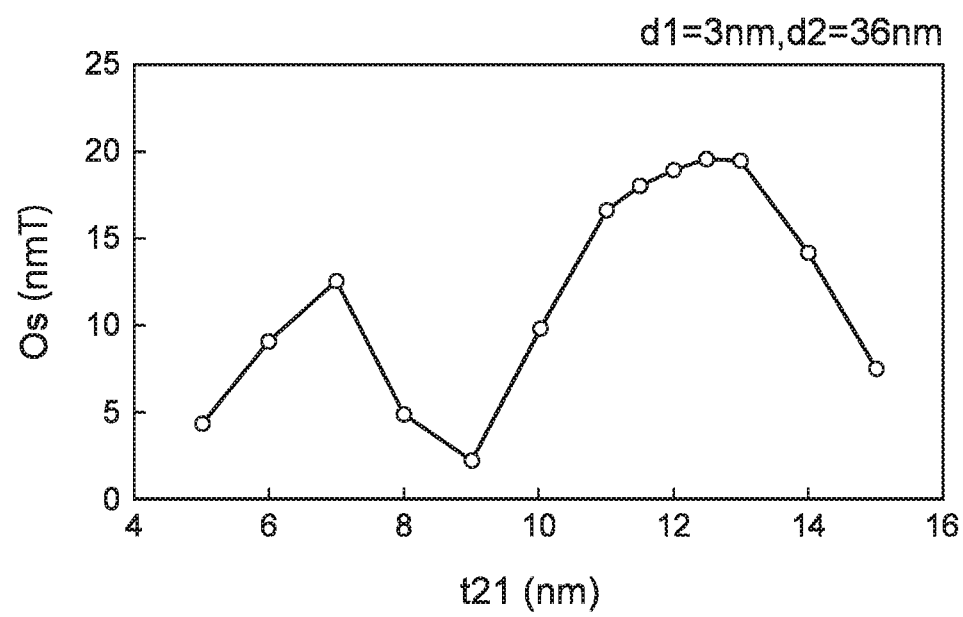

FIG. 12A and FIG. 12B are graphs illustrating characteristics of the magnetic head.

FIG. 12A illustrates simulation results of the oscillation characteristic when the magnetic thickness Mst of the first magnetic layer 21 is changed. The horizontal axis of FIG. 12A is the magnetic thickness Mst (nmT) of the first magnetic layer 21. The vertical axis of FIG. 12A is the oscillation intensity OS (nmT). The first distance d1 is 3 nm. In the simulation of FIG. 12A, the physical property values of $Fe_{60}Co_{40}$ are used as the physical property values of the first magnetic layer 21.

As shown in FIG. 12A, the oscillation intensity OS has a peak when the magnetic thickness Mst of the first magnetic layer 21 is not less than 25 nmT and not more than 35 nmT. In the embodiment, it is favorable for the magnetic thickness Mst of the first magnetic layer 21 to be not less than 25 nmT and not more than 30 nmT. It is considered that the first magnetic layer 21 and the magnetic pole 30 resonate with each other easily when the magnetic thickness Mst of the first magnetic layer 21 is not less than 25 nmT and not more than 30 nmT.

As shown in FIG. 12A, the oscillation intensity OS has another low peak when the magnetic thickness Mst of the first magnetic layer 21 is about 18 nmT. It may be considered that the general characteristic occurs in which the effects of the magnetic pole 30 on the oscillation of the first magnetic layer 21 are small when the magnetic thickness Mst of the first magnetic layer 21 is about 18 nmT or less.

FIG. 12B illustrates simulation results of the oscillation characteristic when the first thickness t21 of the first magnetic layer 21 is changed. The horizontal axis of FIG. 12B is the first thickness t21 (nm) of the first magnetic layer 21. The vertical axis of FIG. 12B is the oscillation intensity OS (nmT). The first distance d1 is 3 nm. The second distance d2 is 36 nm. In the simulation of FIG. 12B, the physical property values of $Fe_{60}Co_{40}$ are used as the physical property values of the first magnetic layer 21.

As shown in FIG. 12B, the oscillation intensity OS has a peak when the first thickness t21 of the first magnetic layer 21 is not less than 9 nm and not more than 15 nm. In the embodiment, it is favorable for the first thickness t21 of the first magnetic layer 21 to be not less than 9 nm and not more than 15 nm. It is considered that the first magnetic layer 21 and the magnetic pole 30 resonate with each other easily when the first thickness t21 of the first magnetic layer 21 is not less than 9 nm and not more than 15 nm.

As shown in FIG. 12B, the oscillation intensity OS has another low peak when the first thickness t21 of the first magnetic layer 21 is about 7 nm. It may be considered that the general characteristic occurs in which the effects of the magnetic pole 30 on the oscillation of the first magnetic layer 21 are small when the first thickness t21 of the first magnetic layer 21 is about 7 nm.

As described above, the length of the first magnetic layer 21 along the second direction D2 is taken as the first width w1; and the length of the magnetic pole 30 along the second direction D2 is taken as the second width w2 (referring to FIG. 1). An example of the oscillation characteristic when a ratio R1 of the first width w1 to the second width w2 is changed will now be described. The ratio R1 is w1/w2.

Figure 13:
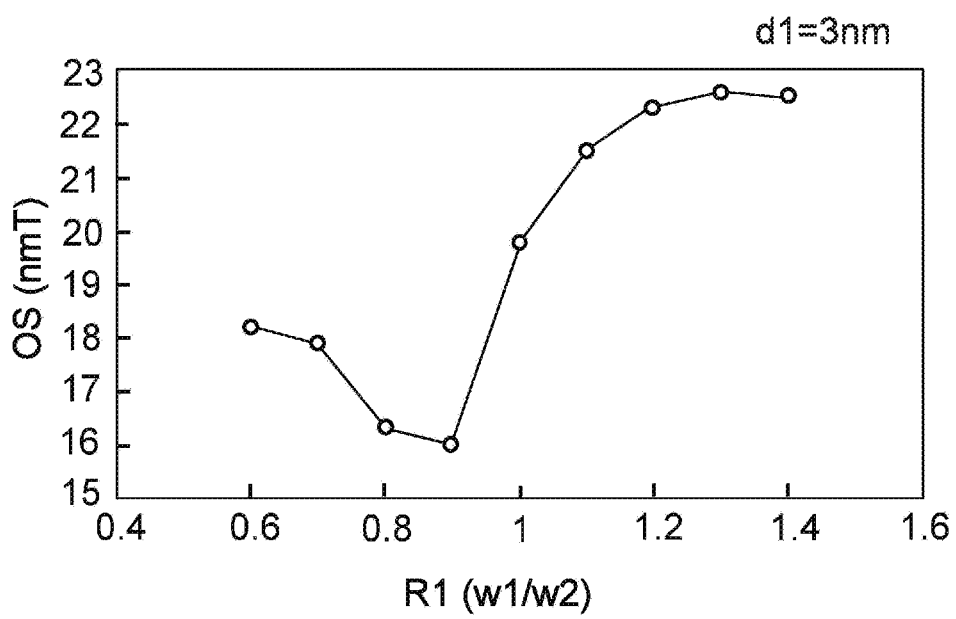
FIG. 13 is a graph illustrating a characteristic of the magnetic head.

FIG. 13 is a graph illustrating a characteristic of the magnetic head.

The horizontal axis of FIG. 13 is the simulation results of the oscillation characteristic when the ratio R1 is changed. In the model of the simulation, the magnetic thickness Mst of the first magnetic layer 21 is 25 nmT. The physical property values of $Fe_{60}Co_{40}$ are used as the physical property values of the first magnetic layer 21. The first distance d1 is 3 nm. The horizontal axis of FIG. 13 is the ratio R1. The vertical axis of FIG. 13 is the oscillation intensity OS (nmT). As shown in FIG. 13, a large oscillation intensity is obtained when the ratio is greater than 1.

In the embodiment, it is favorable for the first width w1 of the first magnetic layer 21 along the second direction D2 to be wider than the second width w2 of the magnetic pole 30 along the second direction D2. For example, the first width w1 may be not more than 2 times the second width w2. The first width w1 may be not less than 1 times and not more than 2 times the second width w2. The first width w1 may be not less than 1 times and not more than 1.4 times the second width w2. A large oscillation intensity is obtained stably.

As described above, the length of the first magnetic layer 21 along the third direction D3 is taken as the third length L3 (referring to FIG. 4). An example of the oscillation characteristic when a ratio R2 of the third length L3 to the first width w1 is changed will now be described. The ratio R2 is L3/w1.

In the embodiment, it is favorable for the third length L3 of the first magnetic layer 21 along the third direction D3 to be not less than 0.9 times the first width w1 of the first magnetic layer 21 along the second direction D2. A large oscillation intensity is obtained stably. As described above, the second direction D2 crosses the first direction D1 and is along the medium-opposing surface 30F. The second direction D2 is parallel to the medium-opposing surface 30F and perpendicular to the first direction D1. For example, the third direction D3 is perpendicular to a plane including the first direction D1 and the second direction D2.

In the embodiment, it is favorable for the saturation magnetization of the first magnetic layer 21 to be 1.8 T or more. Thereby, for example, the gradient (the steepness) of the recording magnetic field at the magnetic recording medium 80 increases because a portion of the magnetic flux flowing from the magnetic pole 30 through the medium into the first shield 31 passes through the first magnetic layer 21. The linear recording density is increased thereby.

In the embodiment, it is favorable for the saturation magnetization of the first magnetic layer 21 to be not less than 0.8 times and not more than 1.1 times the saturation magnetization of the magnetic pole 30. Thereby, for example, the oscillation frequency of the first magnetic layer 21 and the oscillation frequency of the portion of the magnetic pole 30 at the first magnetic layer 21 side approach each other. The first magnetic layer 21 oscillates more easily thereby.

In the embodiment, it is favorable for the first magnetic layer 21 to include at least one selected from the group consisting of Fe and Co. The first magnetic layer 21 may further include at least one selected from the group consisting of Ni, Al, Tb, Ge, Ga, Bo, Ta, Ru, Ro, Pt, and Ag. Thereby, for example, the spin inflow from the second magnetic layer 22 (e.g., the spin injection layer) can be large. For example, the magnetostriction and the residual magnetization of the first magnetic layer 21 (e.g., the oscillation generation layer) decrease. For example, the first magnetic layer 21 can oscillate more stably.

In the embodiment, it is favorable for the second magnetic layer 22 to include at least one selected from the group consisting of Fe, Co, Ni, Al, Bo, Te, Ge, and Ga.

In the embodiment, the intermediate layer 23 includes, for example, at least one selected from the group consisting of Cu, Au, and Ag. Thereby, for example, the spin inflow from the second magnetic layer 22 is increased; and the first magnetic layer 21 easily oscillates stably. It is favorable for the thickness t23 of the intermediate layer 23 to be, for example, not less than 1 nm and not more than 4 nm. Thereby, for example, the balance between the magnetic field intensity and the gradient (the steepness) of the recording magnetic field at the magnetic recording medium 80 is adjusted easily. The linear recording density can be increased thereby.

In the embodiment, the second nonmagnetic layer 25 includes, for example, at least one selected from the group consisting of Ru, Ta, Cr, and Ti. Thereby, for example, the spin inflow from the first shield 31 can be suppressed; and the magnetization of the second magnetic layer 22 can be reversed stably. It is favorable for the thickness t25 of the second nonmagnetic layer 25 to be, for example, not less than 8 nm and not more than 20 nm. Thereby, for example, the balance between the magnetic field intensity and the gradient (the steepness) of the recording magnetic field at the magnetic recording medium 80 is adjusted easily. The linear recording density can be increased thereby.

In the embodiment, it is favorable for the second distance d2 (the magnetic gap) to be, for example, not less than 28 nm and not more than 40 nm. Thereby, for example, the balance between the magnetic field intensity and the gradient (the steepness) of the recording magnetic field at the magnetic recording medium 80 is adjusted easily. The linear recording density can be increased thereby.

FIG. 14 to FIG. 17 are graphs illustrating characteristics of the magnetic head.

These figures illustrate characteristics when information is recorded in the magnetic recording medium 80 by using the magnetic head 110 according to the embodiment. These figures show simulation results for a shortest bit length BLs at which good recording is possible when a third distance d3 between the first magnetic layer 21 and the first shield 31 along the first direction D1 (referring to FIG. 1) is changed. In the model of the simulation, the first distance d1 is 3 nm; the first thickness t21 is 12 nm; the magnetic thickness Mst of the first magnetic layer 21 is 28.8 nmT; and the physical property values of $Fe_{60}C_{40}$ are used as the physical property values of the first magnetic layer 21. In FIG. 14 to FIG. 17, the regions shown by dots correspond to conditions at which good characteristics are obtained.

Figure 14:
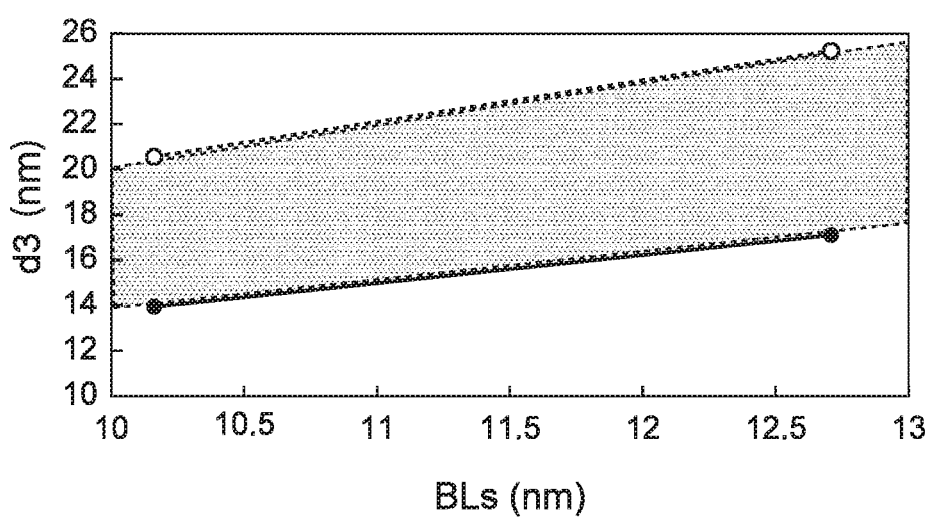
FIG. 14 is a graph illustrating characteristics of the magnetic head.

The horizontal axis of FIG. 14 is the shortest bit length BLs (nm). The vertical axis of FIG. 14 is the third distance d3 (nm). In FIG. 14, the solid line corresponds to the minimum value of the third distance d3 at which good recording is possible for the target shortest bit length BLs. In FIG. 14, the broken line corresponds to the maximum value of the third distance d3 at which good recording is possible for the target shortest bit length BLs. As shown in FIG. 14, the minimum value and the maximum value of the third distance d3 at which good recording is possible increase as the shortest bit length BLs increases.

Figure 15:
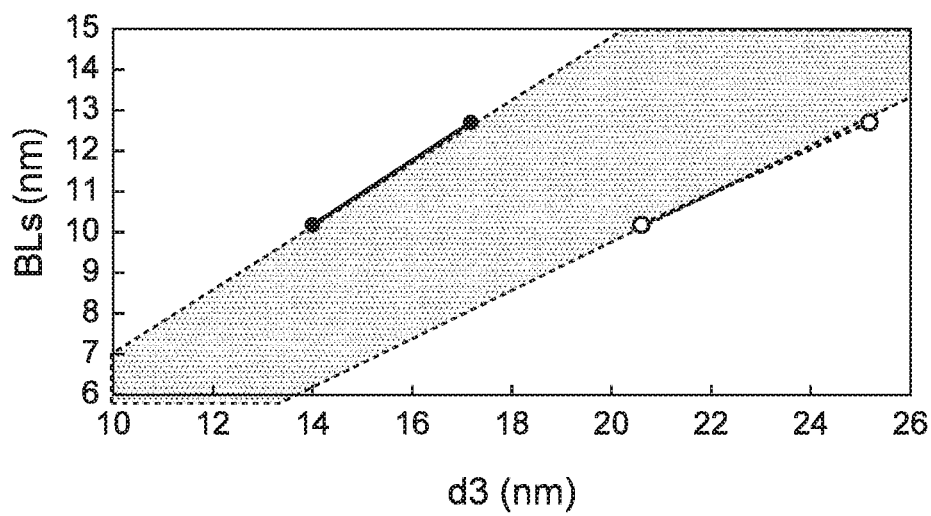
FIG. 15 is a graph illustrating characteristics of the magnetic head.

In FIG. 15, the horizontal axis is the third distance d3 (nm); and the vertical axis is the shortest bit length BLs (nm). As shown in FIG. 15, the shortest bit length BLs at which good recording is possible increases as the third distance d3 increases.

Figure 16:
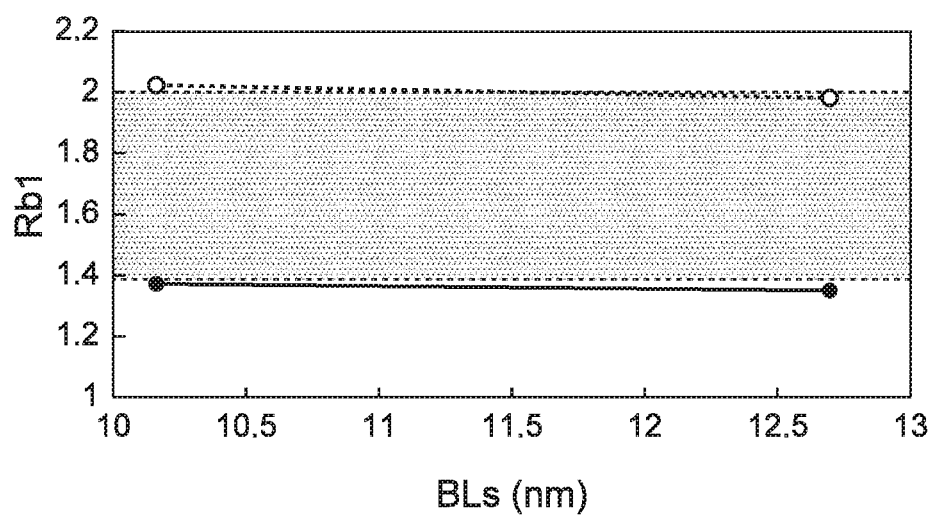
FIG. 16 is a graph illustrating characteristics of the magnetic head.

The horizontal axis of FIG. 16 is the shortest bit length BLs (nm). The vertical axis of FIG. 16 is a ratio Rb1 of the third distance d3 to the shortest bit length BLs (i.e., d3/BLs). In FIG. 16, the solid line corresponds to the minimum value of the ratio Rb1 at which good recording is possible for the target shortest bit length BLs. In FIG. 16, the broken line corresponds to the maximum value of the ratio Rb1 at which good recording is possible for the target shortest bit length BLs. As shown in FIG. 16, the ratio Rb1 at which good recording is possible is not less than 1.3 and not more than 2.

Figure 17:
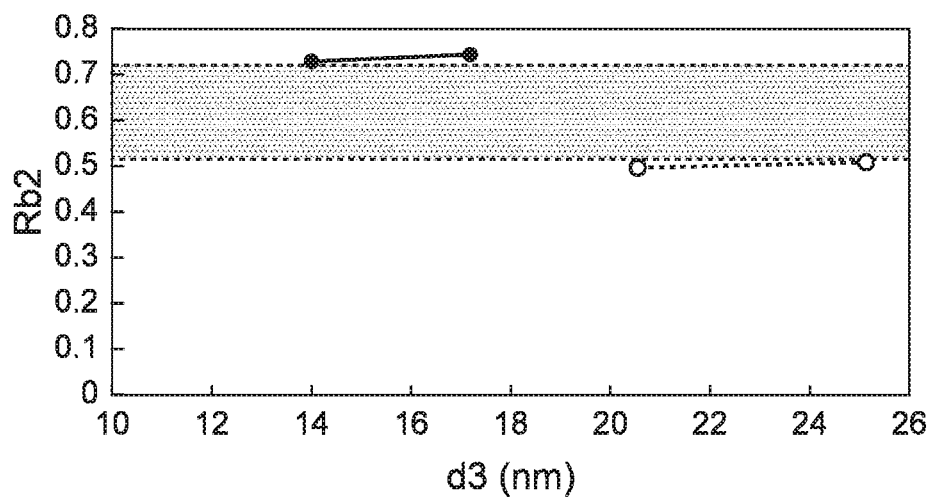
FIG. 17 is a graph illustrating characteristics of the magnetic head.

The horizontal axis of FIG. 17 is the third distance d3 (nm). The vertical axis of FIG. 17 is a ratio Rb2 of the shortest bit length BLs to the third distance d3 (i.e., BLs/d3). In FIG. 17, the solid line corresponds to the minimum value of the ratio Rb2 at which good recording is possible for the target third distance d3. In FIG. 17, the broken line corresponds to the maximum value of the ratio Rb2 at which good recording is possible for the target third distance d3. As shown in FIG. 17, the ratio Rb2 at which good recording is possible is not less than 0.5 and not more than 0.7.

For example, it is considered that in the magnetic head 110, the magnetization of the first magnetic layer 21 rotates at a small angle of 10 degrees to 25 degrees when referenced to the first direction D1 (referring to FIG. 4) when the first magnetic layer 21 oscillates and the current is such that the recording density is a maximum. It is considered that when the magnetization of the first magnetic layer 21 rotates at a large angle, the magnetic flux does not enter the first magnetic layer 21 easily, and the spacing between the magnetic pole 30 and the first shield 31 corresponds to the "recording gap". Conversely, it is considered that when the magnetization of the first magnetic layer 21 rotates at a small angle, the spacing (the third distance d3) between the first magnetic layer 21 and the first shield 31 corresponds to the substantial "recording gap". It is considered that in such a case, the gradient of the recording magnetic field at the magnetic recording medium 80 increases, and the linear recording density increases.

When the magnetic head 110 according to the embodiment is used, it is favorable for the shortest bit length BLs of the magnetic recording medium 80 to be not less than 0.5 times and not more than 0.78 times the third distance d3 (the distance between the first magnetic layer 21 and the first shield 31 along the first direction D1).

Figure 18:
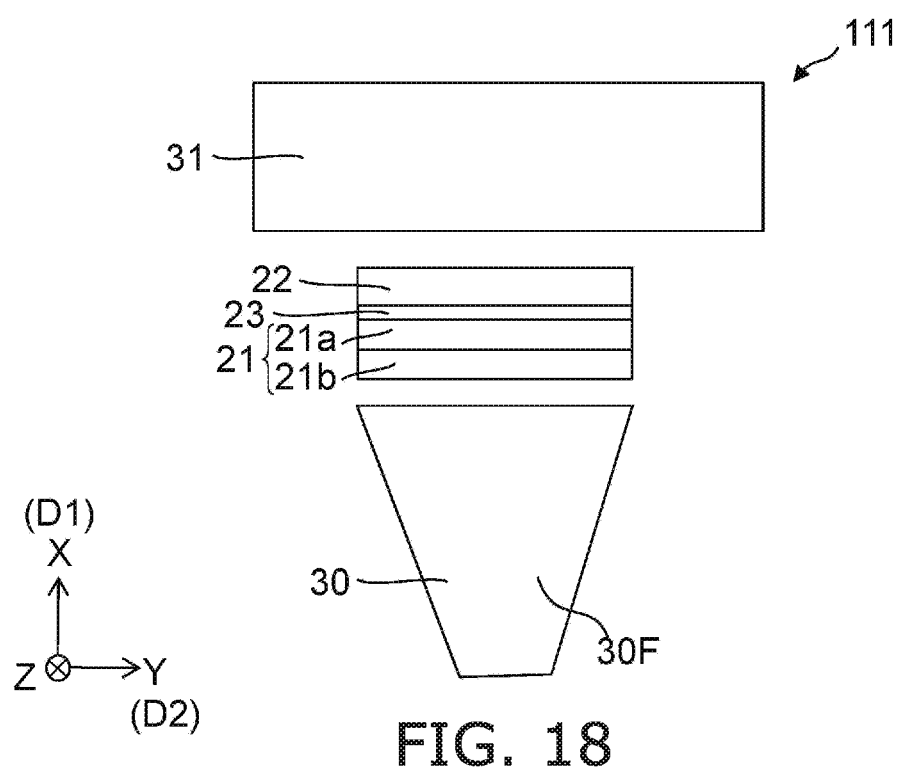
FIG. 18 is a schematic plan view illustrating a magnetic head according to the first embodiment.

FIG. 18 is a schematic plan view illustrating a magnetic head according to the first embodiment.

FIG. 18 is a plan view corresponding to the plan view as viewed along arrow AR1. The first nonmagnetic layer 24, the second nonmagnetic layer 25, and the insulating portion 30i are not illustrated in FIG. 18.

In the magnetic head 111 as shown in FIG. 18, the first magnetic layer 21 may include a first magnetic film 21a and a second magnetic film 21b. The first magnetic film 21a is between the second magnetic film 21b and the intermediate layer 23. The first magnetic film 21a includes, for example, Fe, Co, Ag, Al, Mg, or a half-metal. The second magnetic film 21b includes, for example, at least one selected from the group consisting of Ni, Fe, and Co. By such a configuration, for example, good soft magnetic properties of the first magnetic layer 21 are obtained. For example, good spin polarization is obtained.

In the embodiment, an alternating-current magnetic field is generated from the stacked body 20 when a current flows in the stacked body 20. For example, the first distance d1 is not less than 1% and not more than 10% of the second distance d2. Thereby, the first magnetic layer 21 and the magnetic pole 30 resonate with each other. A stable alternating-current magnetic field is generated from the stacked body 20. The resonant frequency of the magnetic recording medium 80 is set to substantially match the frequency of the alternating-current magnetic field. For example, the resonant frequency of the magnetic recording medium 80 is not less than 0.95 times and not more than 1.05 times the frequency of the alternating-current magnetic field. An effective MAMR can be performed.

An example of a magnetic recording device according to the embodiment will now be described. The magnetic recording device may be a magnetic recording and reproducing device. The magnetic head may include a recording portion and a reproducing portion.

Figure 19:
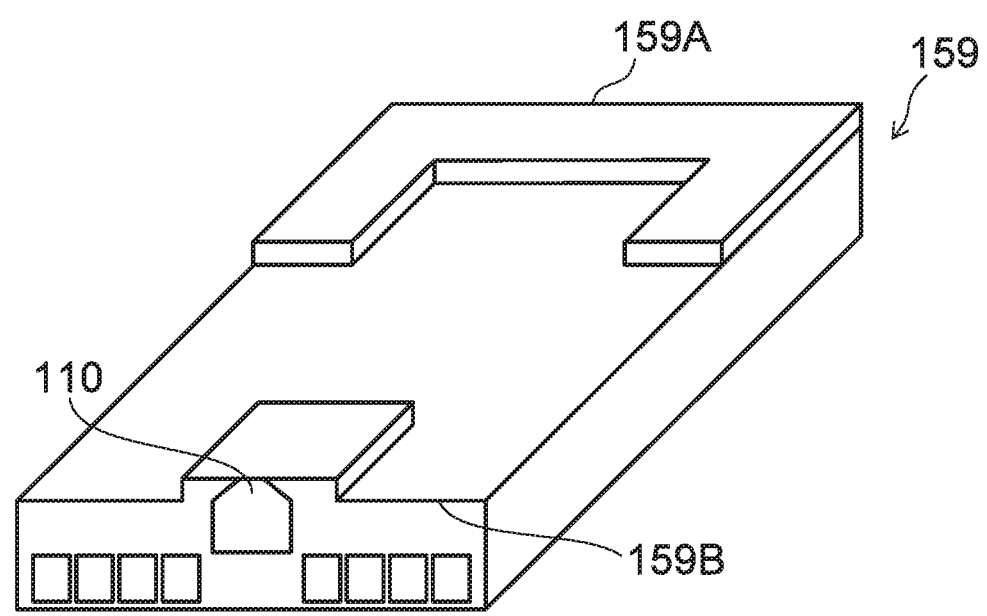
FIG. 19 is a schematic perspective view illustrating a portion of the magnetic recording device according to the embodiment.

FIG. 19 is a schematic perspective view illustrating a portion of the magnetic recording device according to the embodiment.

FIG. 19 illustrates a head slider.

The magnetic head 110 is provided in the head slider 159. The head slider 159 includes, for example, $Al_2O_3$/TiC, etc. The head slider 159 moves relative to the magnetic recording medium while flying over or contacting the magnetic recording medium.

The head slider 159 has, for example, an air inflow side 159A and an air outflow side 159B. The magnetic head 110 is disposed at the side surface of the air outflow side 159B of the head slider 159 or the like. Thereby, the magnetic head 110 moves relative to the magnetic recording medium while flying over or contacting the magnetic recording medium.

Figure 20:
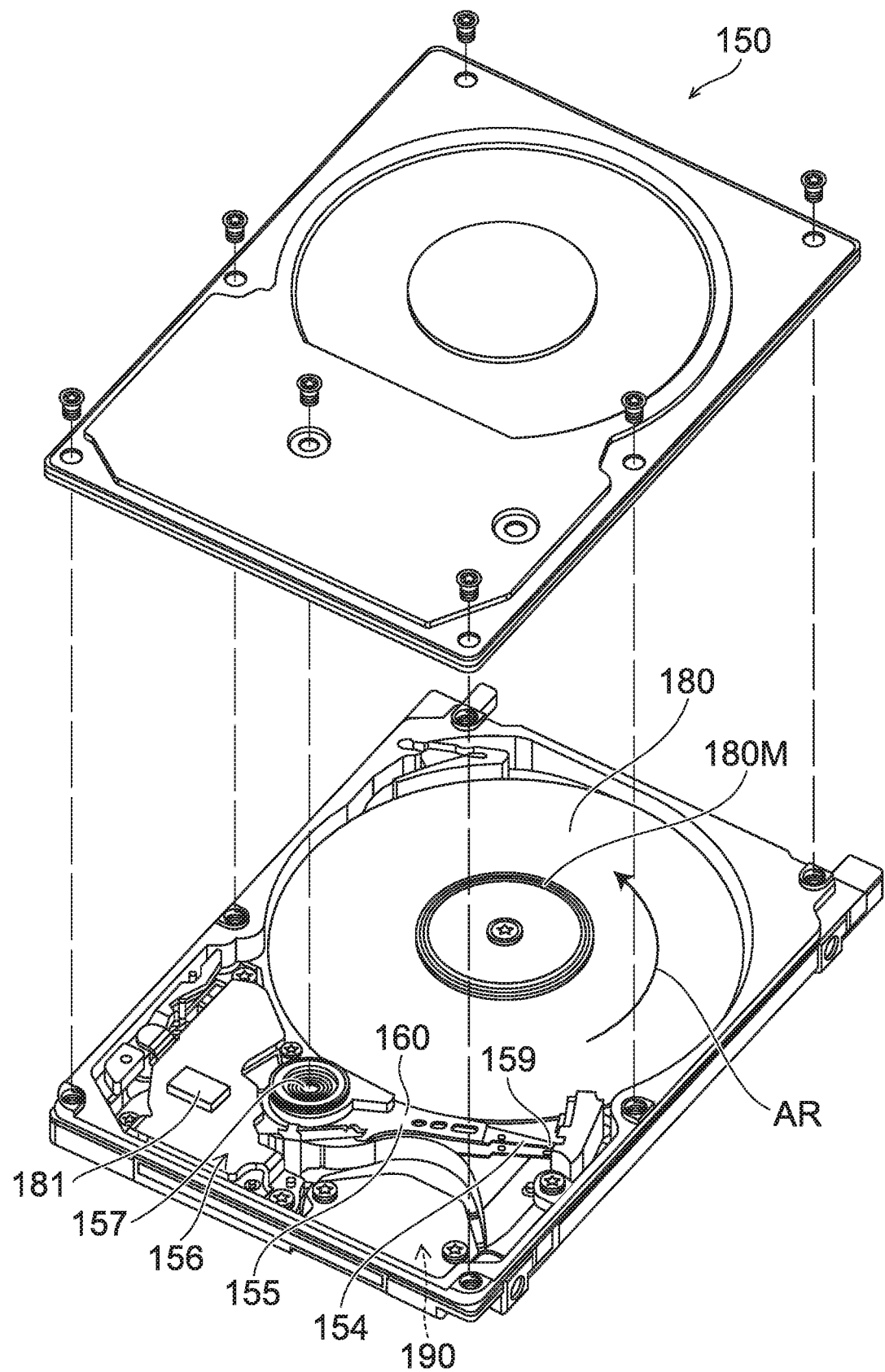
FIG. 20 is a schematic perspective view illustrating the magnetic recording device according to the embodiment.

FIG. 20 is a schematic perspective view illustrating the magnetic recording device according to the embodiment.

Figure 21A:
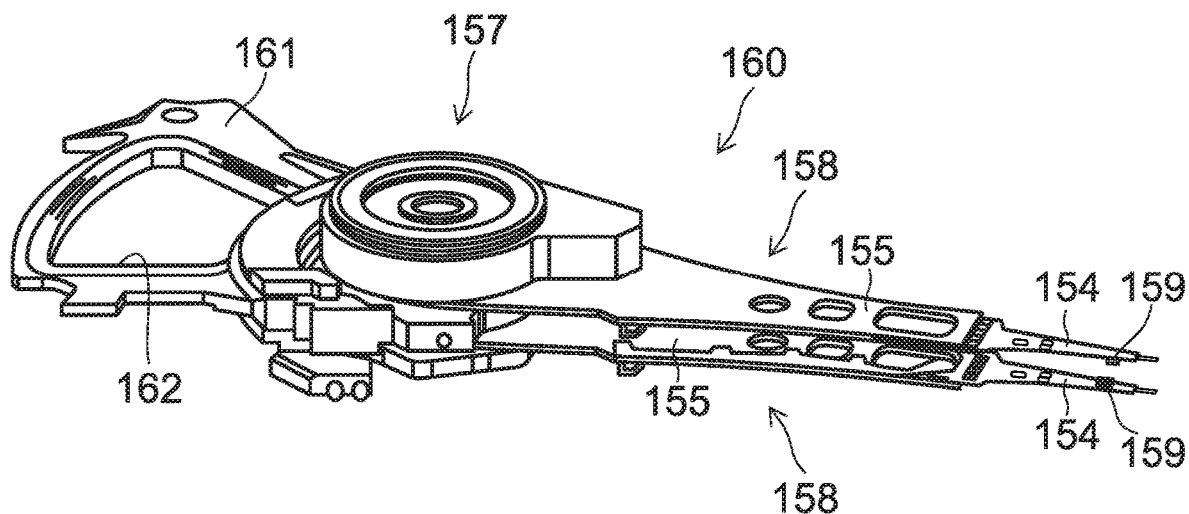
FIG. 21A and FIG. 21B are schematic perspective views illustrating a portion of the magnetic recording device according to the embodiment.
Figure 21B:
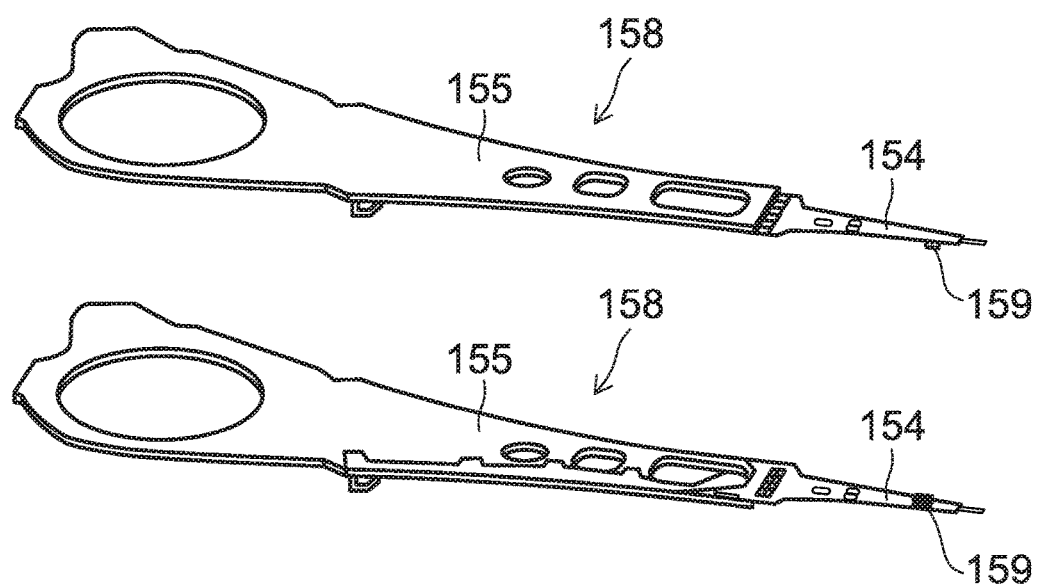

FIG. 21A and FIG. 21B are schematic perspective views illustrating a portion of the magnetic recording device according to the embodiment.

As shown in FIG. 20, a rotary actuator is used in the magnetic recording device 150 according to the embodiment. A recording medium disk 180 is mounted to a spindle motor 180M. The recording medium disk 180 is rotated in the direction of arrow AR by the spindle motor 180M. The spindle motor 180M responds to a control signal from a drive device controller. The magnetic recording device 150 according to the embodiment may include multiple recording medium disks 180. The magnetic recording device 150 may include a recording medium 181. The recording medium 181 is, for example, a SSD (Solid State Drive). The recording medium 181 includes, for example, nonvolatile memory such as flash memory, etc. For example, the magnetic recording device 150 may be a hybrid HDD (Hard Disk Drive).

The head slider 159 records and reproduces the information recorded in the recording medium disk 180. The head slider 159 is provided at the tip of a suspension 154 having a thin-film configuration. The magnetic head according to the embodiment is provided at the tip vicinity of the head slider 159.

When the recording medium disk 180 rotates, the downward pressure due to the suspension 154 and the pressure generated by the medium-opposing surface (the ABS) of the head slider 159 are balanced. The distance between the medium-opposing surface of the head slider 159 and the surface of the recording medium disk 180 becomes a prescribed fly height. In the embodiment, the head slider 159 may contact the recording medium disk 180. For example, contact-sliding is applicable.

The suspension 154 is connected to one end of an arm 155 (e.g., an actuator arm). The arm 155 includes, for example, a bobbin part, etc. The bobbin part holds a drive coil. A voice coil motor 156 is provided at the other end of the arm 155. The voice coil motor 156 is one type of linear motor. The voice coil motor 156 includes, for example, the drive coil and a magnetic circuit. The drive coil is wound onto the bobbin part of the arm 155. The magnetic circuit includes a permanent magnet and an opposing yoke. The drive coil is provided between the permanent magnet and the opposing yoke. The suspension 154 has one end and another end. The magnetic head is provided at the one end of the suspension 154. The arm 155 is connected to the other end of the suspension 154.

The arm 155 is held by ball bearings. The ball bearings are provided at two locations above and below a bearing part 157. The arm 155 can rotate and slide due to the voice coil motor 156. The magnetic head is movable to any position of the recording medium disk 180.

FIG. 21A illustrates the configuration of a portion of the magnetic recording device and is an enlarged perspective view of a head stack assembly 160.

FIG. 21B is a perspective view illustrating a magnetic head assembly (a head gimbal assembly (HGA)) 158 that is a portion of the head stack assembly 160.

As shown in FIG. 21A, the head stack assembly 160 includes the bearing part 157, the head gimbal assembly 158, and a support frame 161. The head gimbal assembly 158 extends from the bearing part 157. The support frame 161 extends from the bearing part 157. The direction in which the support frame 161 extends is the reverse of the direction in which the head gimbal assembly 158 extends. The support frame 161 supports a coil 162 of the voice coil motor 156.

As shown in FIG. 21B, the head gimbal assembly 158 includes the arm 155 extending from the bearing part 157, and the suspension 154 extending from the arm 155.

The head slider 159 is provided at the tip of the suspension 154. The magnetic head according to the embodiment is provided at the head slider 159.

The magnetic head assembly (the head gimbal assembly) 158 according to the embodiment includes the magnetic head according to the embodiment, the head slider 159 on which the magnetic head is provided, the suspension 154, and the arm 155. The head slider 159 is provided at one end of the suspension 154. The arm 155 is connected to the other end of the suspension 154.

The suspension 154 includes, for example, lead wires (not illustrated) for recording and reproducing signals. The suspension 154 may include, for example, lead wires (not illustrated) for a heater that adjusts the fly height. The suspension 154 may include, for example, lead wires (not illustrated) for a spin torque oscillator, etc. These lead wires are electrically connected to multiple electrodes provided in the magnetic head.

A signal processor 190 is provided in the magnetic recording device 150. The signal processor 190 records and reproduces the signals to and from the magnetic recording medium by using the magnetic head. For example, the signal processor 190 is electrically connected to the magnetic head by the input/output lines of the signal processor 190 being connected to electrode pads of the head gimbal assembly 158.

The magnetic recording device 150 according to the embodiment includes a magnetic recording medium, the magnetic head according to the embodiment, a movable part, a position controller, and a signal processor. The movable part causes the magnetic recording medium and the magnetic head to separate or causes the magnetic recording medium and the magnetic head to be movable relative to each other in a state of contact. The position controller aligns the magnetic head at a prescribed recording position of the magnetic recording medium. The signal processor records and reproduces the signals to and from the magnetic recording medium by using the magnetic head.

For example, the recording medium disk 180 is used as the magnetic recording medium recited above. The movable part recited above includes, for example, the head slider 159. The position controller recited above includes, for example, the head gimbal assembly 158.

The embodiments may include the following configurations (e.g., technological proposals).

Configuration 1

A magnetic head, comprising:
a magnetic pole;
a first shield;
a first magnetic layer provided between the magnetic pole and the first shield;
a second magnetic layer provided between the first magnetic layer and the first shield; and
an intermediate layer provided between the first magnetic layer and the second magnetic layer, the intermediate layer being nonmagnetic,
a first distance between the magnetic pole and the first magnetic layer along a first direction being not less than 1% and not more than 10% of a second distance between the magnetic pole and the first shield along the first direction, the first direction being from the first magnetic layer toward the second magnetic layer Configuration 2

The magnetic head according to Configuration 1, wherein the first distance is not less than 1 nm and not more than 4 nm.

Configuration 3

The magnetic head according to Configuration 1, further comprising a first nonmagnetic layer including at least one selected from the group consisting of Ru, Ta, Cr, and Ti and being provided between the magnetic pole and the first magnetic layer,
a thickness of the first nonmagnetic layer along the first direction being 3 nm or less.

Configuration 4

The magnetic head according to any one of Configurations 1 to 3, wherein a first thickness of the first magnetic layer along the first direction is not less than 20% and not more than 40% of the second distance.

Configuration 5

The magnetic head according to any one of Configurations 1 to 3, wherein a thickness of the second magnetic layer along the first direction is thinner than a first thickness of the first magnetic layer along the first direction.

Configuration 6

The magnetic head according to any one of Configurations 1 to 5, wherein
the magnetic pole has a medium-opposing surface, and
a first width of the first magnetic layer along a second direction is wider than a second width of the magnetic pole along the second direction, the second direction crossing the first direction and being along the medium-opposing surface.

Configuration 7

The magnetic head according to any one of Configurations 1 to 5, wherein
the magnetic pole has a medium-opposing surface, and
a first width of the first magnetic layer along a second direction is not more than 2 times a second width of the magnetic pole along the second direction, the second direction crossing the first direction and being along the medium-opposing surface.

Configuration 8

The magnetic head according to any one of Configurations 1 to 5, wherein
the magnetic pole has a medium-opposing surface, and
a first width of the first magnetic layer along a second direction is not less than 1 times and not more than 2 times a second width of the magnetic pole along the second direction, the second direction crossing the first direction and being along the medium-opposing surface.

Configuration 9

The magnetic head according to any one of Configurations 1 to 5, wherein
the magnetic pole has a medium-opposing surface,
a third length along a third direction of the first magnetic layer is not less than 0.9 times a first width of the first magnetic layer along the second direction,
the second direction crosses the first direction and is along the medium-opposing surface, and
the third direction crosses a plane including the first direction and the second direction.

Configuration 10

The magnetic head according to any one of Configurations 1 to 9, wherein a saturation magnetization of the first magnetic layer is 1.8 T or more.

Configuration 11

The magnetic head according to any one of Configurations 1 to 10, wherein a saturation magnetization of the first magnetic layer is not less than 0.8 times and not more than 1.1 times a saturation magnetization of the magnetic pole.

Configuration 12

The magnetic head according to any one of Configurations 1 to 11, wherein
the first magnetic layer includes a first magnetic film and a second magnetic film,
the first magnetic film is between the second magnetic film and the intermediate layer,
the first magnetic film includes at least one selected from the group consisting of Fe, Co, Ag, Al, Mg, and a half-metal, and
the second magnetic film includes at least one selected from the group consisting of Ni, Fe, and Co.

Configuration 13

The magnetic head according to any one of Configurations 1 to 11, wherein the first magnetic layer includes at least one selected from the group consisting of Fe and Co.

Configuration 14

The magnetic head according to Configuration 13, wherein the first magnetic layer further includes at least one selected from the group consisting of Ni, Al, Tb, Ge, Ga, Bo, Ta, Ru, Ro, Pt, and Ag.

Configuration 15

The magnetic head according to any one of Configurations 1 to 14, wherein the second magnetic layer includes at least one selected from the group consisting of Fe, Co, Ni, Al, Bo, Te, Ge, and Ga.

Configuration 16

The magnetic head according to any one of Configurations 1 to 15, wherein an alternating-current magnetic field is generated from a stacked body when a current flows in the stacked body, the stacked body including the first magnetic layer, the intermediate layer, and the second magnetic layer.

Configuration 17

The magnetic head according to any one of Configurations 1 to 16, wherein the first magnetic layer and the magnetic pole resonate with each other.

Configuration 18

A magnetic recording device, comprising:
the magnetic head according to any one of Configurations 1 to 17; and
a magnetic recording medium, information being recorded in the magnetic recording medium by the magnetic head.

Configuration 19

The magnetic recording device according to Configuration 18, wherein a shortest bit length of the magnetic recording medium is not less than 0.5 times and not more than 0.78 times a third distance between the first magnetic layer and the first shield along the first direction.

Configuration 20

The magnetic recording device according to Configuration 18 or 19, wherein
an alternating-current magnetic field is generated from a stacked body when a current flows in the stacked body, the stacked body including the first magnetic layer, the intermediate layer, and the second magnetic layer, and
a resonant frequency of the magnetic recording medium is not less than 0.95 times and not more than 1.05 times a frequency of the alternating-current magnetic field.

According to the embodiments, a magnetic head and a magnetic recording device can be provided in which the recording density can be increased.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in magnetic heads such as magnetic poles, first shields, second shields, stacked bodies, magnetic layers, conductive layers, wirings, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all magnetic heads, and magnetic recording devices practicable by an appropriate design modification by one skilled in the art based on the magnetic heads, and the magnetic recording devices described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A magnetic recording device, comprising:
 a magnetic head; and
 a magnetic recording medium, information being recorded in the magnetic recording medium by the magnetic head,
 wherein the magnetic head comprises:
  a magnetic pole;
  a first shield;
  a first magnetic layer provided between the magnetic pole and the first shield;
  a second magnetic layer provided between the first magnetic layer and the first shield; and
  an intermediate layer provided between the first magnetic layer and the second magnetic layer, the intermediate layer being nonmagnetic,
  a first distance between the magnetic pole and the first magnetic layer along a first direction being not less than 1% and not more than 10% of a second distance between the magnetic pole and the first shield along the first direction, the first direction being from the first magnetic layer toward the second magnetic layer,
 wherein a shortest bit length of the magnetic recording medium is not less than 0.5 times and not more than 0.78 times a third distance between the first magnetic layer and the first shield along the first direction.

2. The magnetic device according to claim 1, wherein the first distance is not less than 1 nm and not more than 4 nm.

3. The magnetic device according to claim 1, further comprising a first nonmagnetic layer including at least one selected from the group consisting of Ru, Ta, Cr, and Ti and being provided between the magnetic pole and the first magnetic layer,
 a thickness of the first nonmagnetic layer along the first direction being 3 nm or less.

4. The magnetic device according to claim 1, wherein a first thickness of the first magnetic layer along the first direction is not less than 20% and not more than 40% of the second distance.

5. The magnetic device according to claim 1, wherein a thickness of the second magnetic layer along the first direction is thinner than a first thickness of the first magnetic layer along the first direction.

6. The magnetic device according to claim 1, wherein
the magnetic pole has a medium-opposing surface,
a first width of the first magnetic layer along a second direction is wider than a second width of the magnetic pole along the second direction, the second direction crossing the first direction and being along the medium-opposing surface.

7. The magnetic device according to claim 1, wherein
the magnetic pole has a medium-opposing surface, and
a first width of the first magnetic layer along a second direction is not more than 2 times a second width of the magnetic pole along the second direction, the second direction crossing the first direction and being along the medium-opposing surface.

8. The magnetic device according to claim 1, wherein
the magnetic pole has a medium-opposing surface, and
a first width of the first magnetic layer along a second direction is not less than 1 times and not more than 2 times a second width of the magnetic pole along the second direction, the second direction crossing the first direction and being along the medium-opposing surface.

9. The magnetic device according to claim 1, wherein
the magnetic pole has a medium-opposing surface,
a third length along a third direction of the first magnetic layer is not less than 0.9 times a first width of the first magnetic layer along the second direction,
the second direction crosses the first direction and is along the medium-opposing surface, and
the third direction crosses a plane including the first direction and the second direction.

10. The magnetic device according to claim 1, wherein a saturation magnetization of the first magnetic layer is 1.8 T or more.

11. The magnetic device according to claim 1, wherein a saturation magnetization of the first magnetic layer is not less than 0.8 times and not more than 1.1 times a saturation magnetization of the magnetic pole.

12. The magnetic device according to claim 1, wherein
the first magnetic layer includes a first magnetic film and a second magnetic film,
the first magnetic film is between the second magnetic film and the intermediate layer,
the first magnetic film includes at least one selected from the group consisting of Fe, Co, Ag, Al, Mg, and a half-metal, and
the second magnetic film includes at least one selected from the group consisting of Ni, Fe, and Co.

13. The magnetic device according to claim 1, wherein the first magnetic layer includes at least one selected from the group consisting of Fe and Co.

14. The magnetic device according to claim 13, wherein the first magnetic layer further includes at least one selected from the group consisting of Ni, Al, Tb, Ge, Ga, Bo, Ta, Ru, Ro, Pt, and Ag.

15. The magnetic device according to claim 1, wherein the second magnetic layer includes at least one selected from the group consisting of Fe, Co, Ni, Al, Bo, Te, Ge, and Ga.

16. The magnetic device according to claim 1, wherein an alternating-current magnetic field is generated from a stacked body when a current flows in the stacked body, the stacked body including the first magnetic layer, the intermediate layer, and the second magnetic layer.

17. The magnetic device according to claim 1, wherein the first magnetic layer and the magnetic pole resonate with each other.

18. The magnetic device according to claim 1, wherein
an alternating-current magnetic field is generated from a stacked body when a current flows in the stacked body, the stacked body including the first magnetic layer, the intermediate layer, and the second magnetic layer, and
a resonant frequency of the magnetic recording medium is not less than 0.95 times and not more than 1.05 times a frequency of the alternating-current magnetic field.

\* \* \* \* \*